US012544354B2

(12) United States Patent
Kato et al.

(10) Patent No.: US 12,544,354 B2
(45) Date of Patent: Feb. 10, 2026

(54) MITOCHONDRIAL PERMEABILITY TRANSITION PORE (mPTP)-OPENING INHIBITOR, NOVEL COMPOUND EXHIBITING mPTP-OPENING INHIBITORY ACTIVITY, AND USE THEREFOR

(71) Applicant: RIKEN, Wako (JP)

(72) Inventors: Tadafumi Kato, Wako (JP); Mie Sakashita, Wako (JP); Hirochika Kawakami, Wako (JP); Ko Kikuzato, Wako (JP); Fumiyuki Shirai, Wako (JP)

(73) Assignee: RIKEN, Wako (JP)

( * ) Notice: Subject to any disclaimer, the term of this patent is extended or adjusted under 35 U.S.C. 154(b) by 1017 days.

(21) Appl. No.: 17/619,468

(22) PCT Filed: Jun. 17, 2020

(86) PCT No.: PCT/JP2020/023669
§ 371 (c)(1),
(2) Date: Dec. 15, 2021

(87) PCT Pub. No.: WO2020/255983
PCT Pub. Date: Dec. 24, 2020

(65) Prior Publication Data
US 2023/0017537 A1 Jan. 19, 2023

(30) Foreign Application Priority Data
Jun. 18, 2019 (JP) .................................. 2019-112568

(51) Int. Cl.
A61K 31/343 (2006.01)
A61P 37/06 (2006.01)
(52) U.S. Cl.
CPC ............ *A61K 31/343* (2013.01); *A61P 37/06* (2018.01)
(58) Field of Classification Search
CPC .......................... A61K 31/343; A61P 37/06
See application file for complete search history.

(56) References Cited

U.S. PATENT DOCUMENTS 3,438,999 A * 4/1969 Walter .................. C07D 307/00
424/60
3,462,487 A 8/1969 Kinney

FOREIGN PATENT DOCUMENTS

DE            1923964 A1 * 11/1970 ............. A61K 31/65

OTHER PUBLICATIONS

Schwarz et al., Chemistry of Tetracyclines. I. Mercuric Acetate Oxidation of Tetracycline, Journal of Organometallic Chemistry, 1967, 32(4), 1238-1241.*

Fan et al., Ester Prodrugs of Ampicillin Tailored for Intracellular Accumulation, Bioorganic & Medicinal Chemistry Letters, vol. 7, No. 24, pp. 3107-3113, 1997.*
Kalani et al., Mitochondrial permeability transition pore: a potential drug target for neurodegeneration, Drug Discov Today, Dec. 2018;23(12):1983-1989.*
Barillari et al., Classical Bioisosteres, Book Editor(s): Dr. Nathan Brown, Aug. 3, 2012 https://doi.org/10.1002/9783527654307.ch2.*
Crompton et al., "Inhibition by cyclosporin A of a Ca2+-dependent pore in heart mitochondria activated by inorganic phosphate and oxidative stress", Biochem. J., 1988, vol. 255, pp. 357-360.
Connern et al., "Recruitment of mitochondrial cyclophilin to the mitochondrial inner membrane under conditions of oxidative stress that enhance the opening of a calcium-sensitive non-specific channel", Biochem. J., 1994, vol. 302, pp. 321-324.
Friberg et al., "Cyclosporin A, But Not FK 506, Protects Mitochondria and Neurons against Hypoglycemic Damage and Implicates the Mitochondrial Permeability Transition in Cell Death", The Journal of Neuroscience, 1998, vol. 18, No. 14, pp. 5151-5159.
Uchino et al., "Amelioration by cyclosporin A of brain damage in transient fore brain ischemia in the rat", Brain Research, 1998, vol. 812, pp. 216-226.
Korde et al., "Protective Effects of NIM811 in Transient Focal Cerebral Ischemia Suggest Involvement of the Mitochondrial Permeability Transition", Journal of Neurotrauma, 2007, vol. 24, No. 5, pp. 895-908.
Muramatsu et al., "Neuroprotective efficacy of FR901459, a novel derivative of cyclosporin A, in in vitro mitochondrial damage and in vivo transient cerebral ischemia models", Brain Research, 2007, vol. 1149, pp. 181-190.
Schwarz et al., "Chemistry of tetracyclines. I. Mercuric acetate oxidation of tetracycline", Journal of Organometallic Chemistry, 1967, vol. 32, No. 4, pp. 1238-1241.
Shang et al., "Fungal Biotransformation of Tetracycline Antibiotics", Journal of Organic Chemistry, 2016, vol. 81, No. 15, pp. 6186-6194.
International Search Report for Corresponding International Application No. PCT/JP2020/023669 (3 Pages) (Sep. 1, 2020).
Gu et al., "Facile conversion of tetracycline antibiotics to 4,11a-bridged derivatives via oxidative mannich cyclization", The Journal of Antibiotics, 2010, vol. 63, pp. 693-698.
Supplementary European Search Report for Corresponding European Patent Application No. 20827761.6, Feb. 17, 2023, 6 pages.

* cited by examiner

*Primary Examiner* — Svetlana M Ivanova
(74) *Attorney, Agent, or Firm* — Lucas & Mercanti, LLP

(57) ABSTRACT

The present invention aims to provide a novel compound having a high mPTP-opening inhibitory activity and/or a useful therapeutic effect on various diseases. An aspect of the present invention relates to a mitochondrial permeability transition pore (mPTP)-opening inhibitor, a medicament or a pharmaceutical composition comprising a compound represented by formula (I), wherein $R^1$, $R^2$, $R^3$, $R^4$, $R^5$, $R^6$, $R^7$, $R^8$, $R^9$, $R^{10}$ and $R^{11}$ are the same as defined in the specification and the claims, a stereoisomer thereof, a prodrug thereof, or a pharmaceutically acceptable salt thereof, or a pharmaceutically acceptable solvate thereof, as an active ingredient. Another aspect of the present invention relates to a compound represented by formula (Ia), wherein $R^{1a}$, $R^2$, $R^3$, $R^4$, $R^5$, $R^6$, $R^7$, $R^8$, $R^9$, $R^{10}$ and $R^{11}$ are the same as defined in the specification and the claims, a stereoisomer thereof, a prodrug thereof, or a salt thereof, or a solvate thereof.

8 Claims, 5 Drawing Sheets

MITOCHONDRIAL PERMEABILITY TRANSITION PORE (mPTP)-OPENING INHIBITOR, NOVEL COMPOUND EXHIBITING mPTP-OPENING INHIBITORY ACTIVITY, AND USE THEREFOR

CROSS-REFERENCE TO RELATED APPLICATIONS

This application is a 371 of PCT/JP2020/023669, filed Jun. 17, 2020, which claims the benefit of Japanese Patent Application No. 2019-112568, filed Jun. 18, 2019.

TECHNICAL FIELD

The present invention relates to a mitochondrial permeability transition pore (mPTP)-opening inhibitor, a novel compound having mPTP-opening inhibitory activity and use therefor.

BACKGROUND ART

Mitochondria are not only involved in ATP production and intracellular metabolism but also play an important role in temporarily taking up calcium ions and maintaining homeostasis of intracellular calcium ion concentration. Because of this, it has been suggested that mitochondria may be involved in cell death.

It is known that uptake and release of calcium ions by mitochondria are each independently mediated by transportation mechanisms. In releasing calcium ions, it is known that mitochondrial permeabilization pore (hereinafter, referred to also as "mPTP") is involved. When a calcium level within the cytoplasm in cells constituting a tissue excessively increases in a living body, opening of mPTP is induced in mitochondria. As a result, inorganic ions, water and biomolecules present inside and outside the mitochondria enter into mitochondria to reduce mitochondrial membrane potential and swell the mitochondria. At the same time, an apoptosis-inducing factor (hereinafter, referred to also as "AIF") and cytochrome c are released from mitochondria, and a signaling cascade that leads to cell death is activated.

Based on these findings, it has been expected that a compound having mPTP-opening inhibitory activity exerts a preventive or therapeutic effect on various diseases, symptoms or disorders caused by opening of mPTP. For example, cyclosporine A serving as an immunosuppressant is known to bind to cyclophilin D present in mitochondrial matrix to thereby inhibit mPTP-opening and attenuate the functional damage (Non Patent Literatures 1 to 3). It is reported that existing mPTP-opening inhibitors comprising cyclosporine A have nerve cell death protective action to reduce the area of a necrotic lesion in a cerebral infarction model (Non Patent Literatures 4 to 6).

CITATION LIST

Non Patent Literatures

Non Patent Literature 1: Crompton, M et al., Biochem. J., 1988, vol. 255, p. 357-360, Inhibition by cyclosporin A of a Ca2+-dependent pore in heart mitochondria activated by inorganic phosphate and oxidative stress.
Non Patent Literature 2: Connem C P and Halestrap A P, Biochem. J., 1994, vol. 302, p. 321-324, Recruitment of mitochondrial cyclophilin to the mitochondrial inner membrane under conditions of oxidative stress that enhance the opening of a calcium-sensitive non-specific channel.
Non Patent Literature 3: Friberg, H et al. J. Neurosci., 1998, vol. 18(14), p. 5151-5159, Cyclosporin A, But Not FK 506, Protects mitochondria and neurons against hypoglycemic damage and implicates the mitochondrial permeability transition in cell death.
Non Patent Literature 4: Uchino, H et al., Brain Res, 1998, vol. 812, p. 216-226, Amelioration by cyclosporin A of brain damage in transient forebrain ischemia in the rat.
Non Patent Literature 5: Korde A S et al., J Neurotrauma., vol. 24(5), p. 895-908, 2007, Protective effects of NIM811 in transient focal cerebral ischemia suggest involvement of the mitochondrial permeability transition.
Non Patent Literature 6: Muramatsu Y et al., Brain Res., 2007, vol. 1149, p. 181-90, Neuroprotective efficacy of FR901459, a novel derivative of cyclosporin A, in in vitro mitochondrial damage and in vivo transient cerebral ischemia models.

SUMMARY OF INVENTION

Technical Problem

As described above, various types of mPTP-opening inhibitors comprising cyclosporine A are known. However, these existing mPTP-opening inhibitors still had rooms for improvement in view of, e.g., physicochemical properties, mPTP-opening inhibitory activity, and preventive or therapeutic effect on diseases, symptoms or disorders caused by opening of mPTP.

Thus, an object of the present invention is to provide a novel compound having a high mPTP-opening inhibitory activity and/or a useful therapeutic effect on various diseases.

Solution to Problem

The present inventors studied on various means for attaining the object. As a result, they have found that specific analogs of tetracycline known as an antibiotic substance have a high mPTP-opening inhibitory activity. They have also found that specific tetracycline analogs can exert a therapeutic effect on diseases, symptoms or disorders caused by opening of mPTP. Based on these findings, they accomplished the present invention.

In other words, the present invention includes the following aspects and embodiments.

(1) A mitochondrial permeability transition pore (mPTP)-opening inhibitor comprising a compound represented by formula (I):

[Formula 1]

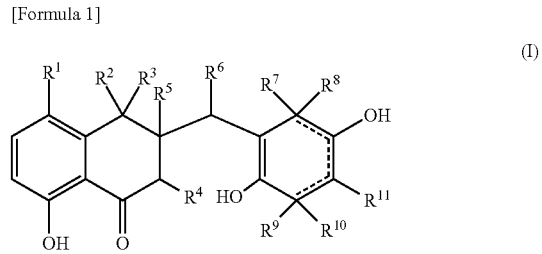

wherein
R¹ represents a hydrogen, a halogen or a substituted or unsubstituted amino,
R², R³, R⁴ and R⁵ satisfy either one of the following conditions (i) and (ii):
(i)
R² represents a hydrogen or a substituted or unsubstituted $C_1$ to $C_5$ alkyl,
R³ and R⁴ together form a —O—C(=O)—, wherein a carbon atom to which R³ is attached is bound to an O, and a carbon atom to which R⁴ is attached is bound to a C(=O), and
R⁵ represents a hydrogen,
(ii)
R² represents a hydrogen or a substituted or unsubstituted $C_1$ to $C_5$ alkyl, and
R³, R⁴ and R⁵ each represent a hydrogen,
R⁶ represents a hydrogen or a hydroxyl, and
R⁷, R⁸, R⁹ and R¹⁰ satisfy either one of the following conditions (xi) and (xii):
(xi)
R⁷ and R⁸ together form an oxo (=O), and
R⁹ and R¹⁰ together form an oxo (=O),
(xii)
R⁷ and R⁹ each represent a hydroxyl,
R⁸, together with a carbon atom attached thereto and an adjacent carbon atom, forms an ethene-1,2-diyl, and
R¹⁰, together with a carbon atom attached thereto and an adjacent carbon atom, forms an ethene-1,2-diyl,
a bond represented by a solid line and a dotted line is a single bond or a double bond, and
R¹¹ represents a —C(=O)—NH₂ or a —CN,
a stereoisomer thereof, a prodrug thereof, or a pharmaceutically acceptable salt thereof, or a pharmaceutically acceptable solvate thereof, as an active ingredient.

(2) The mitochondrial permeability transition pore (mPTP)-opening inhibitor according to embodiment (1), wherein
R² represents a hydrogen or a substituted or unsubstituted $C_1$ to $C_5$ alkyl,
R³ and R⁴ together form a —O—C(=O)—, wherein a carbon atom to which R³ is attached is bound to O, and a carbon atom to which R⁴ is attached is bound to a C(=O)), and
R⁵ represents a hydrogen.

(3) The mitochondrial permeability transition pore (mPTP)-opening inhibitor according to embodiment (1) or (2), wherein R¹ represents a hydrogen.

(4) The mitochondrial permeability transition pore (mPTP)-opening inhibitor according to any one of embodiments (1) to (3), wherein R¹¹ represents a —C(=O)—NH₂.

(5) The mitochondrial permeability transition pore (mPTP)-opening inhibitor according to any one of embodiments (1) to (4), wherein the compound represented by formula (I), a stereoisomer thereof, a prodrug thereof, or a pharmaceutically acceptable salt thereof, or a pharmaceutically acceptable solvate thereof is
2,5-dihydroxy-4-(((1S,4R,10S)-6-hydroxy-1-methyl-3,5-dioxo-1,3,4,5-tetrahydro-1,4-methanobenzo[c]oxepin-10-yl)methyl)-3,6-dioxocyclohexa-1,4-dienocarboxamide (compound I-1);
2,3,5,6-tetrahydroxy-4-(((1S,4R,10S)-6-hydroxy-1-methyl-3,5-dioxo-1,3,4,5-tetrahydro-1,4-methanobenzo[c]oxepin-10-yl)methyl)benzamide (compound I-2);
4-((8-(dimethylamino)-5-hydroxy-4-oxo-1,2,3,4-tetrahydronaphthalen-2-yl)methyl)-2,5-dihydroxy-3,6-dioxocyclohexa-1,4-dienecarboxamide (compound I-3);
3-(((1S,4R,10S)-6-acetoxy-1-methyl-3,5-dioxo-1,3,4,5-tetrahydro-1,4-methanobenzo[c]oxepin-10-yl)methyl)-6-carbamoyl benzene-1,2,4,5-tetraryl tetraacetate (compound I-4);
3-carbamoyl-6-(((1S,4R,10S)-1-methyl-3,5-dioxo-6-(pivaloyloxy)-1,3,4,5-tetrahydro-1,4-methanobenzo[c]oxepin-10-yl)methyl)benzene-1,2,4,5-tetraryl tetrakis(2,2-dimethylpropanoate) (compound I-5);
3-(((1S,4R,10S)-6-(benzoyloxy)-1-methyl-3,5-dioxo-1,3,4,5-tetrahydro-1,4-methanobenzo[c]oxepin-10-yl)methyl)-6-carbamoyl benzene-1,2,4,5-tetraryl tetrabenzoate) (compound I-6);
4-(((1S,4R,10S)-9-chloro-6-hydroxy-1-methyl-3,5-dioxo-1,3,4,5-tetrahydro-1,4-methanobenzo[c]oxepin-10-yl)methyl)-2,5-dihydro-3,6-dioxohexa-1,4-dienecarboxamide (compound Ia-1);
4-(((1S,4R,10S)-9-chloro-6-hydroxy-1-methyl-3,5-dioxo-1,3,4,5-tetrahydro-1,4-methanobenzo[c]oxepin-10-yl)methyl)-2,3,5,6-tetrahydroxybenzamide (compound Ia-2);
2,5-dihydroxy-4-(((1S,2S)-5-hydroxy-1-methyl-4-oxo-1,2,3,4-tetrahydronaphthalen-2-yl)methyl)-3,6-dioxocyclohexa-1,4-dienecarboxamide (compound Ia-3); or
2,5-dihydroxy-4-(((1S,4R,10S)-6-hydroxy-1-methyl-3,5-dioxo-1,3,4,5-tetrahydro-1,4-methanobenzo[c]oxepin-10-yl)methyl)-3,6-dioxocyclohexa-1,4-dienocarboxamide (compound Ia-4).

(6) A medicament comprising a compound represented by formula (I):

[Formula 2]

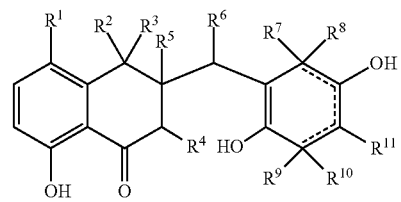

(I)

wherein
R¹ represents a hydrogen, a halogen, or a substituted or unsubstituted amino,
R², R³, R⁴ and R⁵ satisfy either one of the following conditions (i) and (ii):
(i)
R² represents a hydrogen or a substituted or unsubstituted $C_1$ to $C_5$ alkyl,
R³ and R⁴ together form a —O—C(=O)—, wherein a carbon atom to which R³ is attached is bound to an O, and a carbon atom to which R⁴ is attached is bound to a C(=O), and
R⁵ represents a hydrogen,
(ii)
R² represents a hydrogen or a substituted or unsubstituted $C_1$ to $C_5$ alkyl, and
R³, R⁴ and R⁵ each represent a hydrogen,
R⁶ represents a hydrogen or a hydroxyl, and
R⁷, R⁸, R⁹ and R¹⁰ satisfy either one of the following conditions (xi) and (xii)
(xi)
R⁷ and R⁸ together form an oxo (=O), and
R⁹ and R¹⁰ together form an oxo (=O),
(xii)
R⁷ and R⁹ each represent a hydroxyl, R⁸, together with a carbon atom attached thereto and an adjacent carbon atom, forms an ethene-1,2-diyl, and R¹⁰, together with a carbon atom attached thereto and an adjacent carbon atom, forms an ethene-1,2-diyl, a bond represented by a solid line and a dotted line is a single bond or a double bond, R¹¹ represents a —C(═O)—NH₂ or a —CN, a stereoisomer thereof, a prodrug thereof, or a pharmaceutically acceptable salt thereof, or a pharmaceutically acceptable solvate thereof, as an active ingredient, for use in preventing or treating a disease, symptom or disorder caused by opening of mitochondrial permeability transition pore (mPTP).

(7) The medicament according to embodiment (6), wherein

R² represents a hydrogen or a substituted or unsubstituted C₁ to C₅ alkyl,

R³ and R⁴ together form a —O—C(═O)—, wherein a carbon atom to which R³ is attached is bound to an O, and a carbon atom to which R⁴ is attached is bound to a C(═O), and R⁵ represents a hydrogen.

(8) The medicament according to embodiment (6) or (7), wherein R¹ represents a hydrogen.

(9) The medicament according to any one of embodiments (6) to (8), wherein R¹¹ represents a —C(═O)—NH₂.

(10) The medicament according to any one of embodiments (6) to (9), wherein the compound represented by formula (I), a stereoisomer thereof, a prodrug thereof, or a pharmaceutically acceptable salt thereof, or a pharmaceutically acceptable solvate thereof is 2,5-dihydroxy-4-(((1S,4R,10S)-6-hydroxy-1-methyl-3,5-dioxo-1,3,4,5-tetrahydro-1,4-methanobenzo[c]oxepin-10-yl)methyl)-3,6-dioxocyclohexa-1,4-dienocarboxamide (compound I-1);

2,3,5,6-tetrahydroxy-4-(((1S,4R,10S)-6-hydroxy-1-methyl-3,5-dioxo-1,3,4,5-tetrahydro-1,4-methanobenzo[c]oxepin-10-yl)methyl)benzamide (compound I-2);

4-((8-(dimethylamino)-5-hydroxy-4-oxo-1,2,3,4-tetrahydronaphthalen-2-yl)methyl)-2,5-dihydroxy-3,6-dioxocyclohexa-1,4-dienecarboxamide (compound I-3);

3-(((1S,4R,10S)-6-acetoxy-1-methyl-3,5-dioxo-1,3,4,5-tetrahydro-1,4-methanobenzo[c]oxepin-10-yl)methyl)-6-carbamoyl benzene-1,2,4,5-tetraryl tetraacetate (compound I-4);

3-carbamoyl-6-(((1S,4R,10S)-1-methyl-3,5-dioxo-6-(pivaloyloxy)-1,3,4,5-tetrahydro-1,4-methanobenzo[c]oxepin-10-yl)methyl)benzene-1,2,4,5-tetrayl tetrakis(2,2-dimethylpropanoate) (compound I-5);

3-(((1S,4R,10S)-6-(benzoyloxy)-1-methyl-3,5-dioxo-1,3,4,5-tetrahydro-1,4-methanobenzo[c]oxepin-10-yl)methyl)-6-carbamoyl benzene-1,2,4,5-tetraryl tetrabenzoate) (compound I-6);

4-(((1S,4R,10S)-9-chloro-6-hydroxy-1-methyl-3,5-dioxo-1,3,4,5-tetrahydro-1,4-methanobenzo[c]oxepin-10-yl)methyl)-2,5-dihydro-3,6-dioxohexa-1,4-dienecarboxamide (compound Ia-1);

4-(((1S,4R,10S)-9-chloro-6-hydroxy-1-methyl-3,5-dioxo-1,3,4,5-tetrahydro-1,4-methanobenzo[c]oxepin-10-yl)methyl)-2,3,5,6-tetrahydroxybenzamide (compound Ia-2);

2,5-dihydroxy-4-(((1S,2S)-5-hydroxy-1-methyl-4-oxo-1,2,3,4-tetrahydronaphthalen-2-yl)methyl)-3,6-dioxocyclohexa-1,4-dienecarboxamide (compound Ia-3); or 2,5-dihydroxy-4-(((1S,4R,10S)-6-hydroxy-1-methyl-3,5-dioxo-1,3,4,5-tetrahydro-1,4-methanobenzo[c]oxepin-10-yl)methyl)-3,6-dioxocyclohexa-1,4-dienocarboxamide (compound Ia-4).

(11) The medicament according to any one of embodiments (6) to (10), wherein the disease, symptom or disorder caused by opening of mitochondrial permeability transition pore (mPTP) is at least one selected from the group consisting of ischemia-reperfusion injury in percutaneous coronary angioplasty, abnormal engraftment or removal of a transplanted organ, a neurodegenerative disease and a mood disorder.

(12) The medicament according to embodiment (11), wherein the neurodegenerative disease is amyotrophic lateral sclerosis, Alzheimer's disease, Huntington's disease, Parkinson's disease, or multiple sclerosis.

(13) The medicament according to embodiment (11), wherein the mood disorder is bipolar disorder or depression.

(14) The medicament according to according to embodiment (11), which is applied to an organ before transplantation in order to prevent abnormal engraftment or removal of a transplanted organ.

(15) A compound represented by formula (Ia):

[Formula 3]

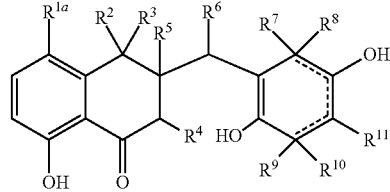

(Ia)

wherein

R², R³, R⁴ and R⁵ satisfy either one of the following conditions (i) and (ii):

(i)

R² represents a hydrogen or a substituted or unsubstituted C₁ to C₅ alkyl,

R³ and R⁴ together form a —O—C(═O)—, wherein a carbon atom to which R³ is attached is bound to an O, and a carbon atom to which R⁴ is attached is bound to a C(═O), and R⁵ represents a hydrogen, (ii)

R² represents a hydrogen or a substituted or unsubstituted C₁ to C₅ alkyl,

R³, R⁴ and R⁵ each represent a hydrogen,

R⁶ represents a hydrogen or a hydroxyl, and

R⁷, R⁸, R⁹ and R¹⁰ satisfy either one of the following conditions (xi) and (xii):

(xi)

R⁷ and R⁸ together form an oxo (═O), and

R⁹ and R¹⁰ together form an oxo (═O), (xii)

R⁷ and R⁹ each represent a hydroxyl,

R⁸, together with a carbon atom attached thereto and an adjacent carbon atom, forms an ethene-1,2-diyl, and R¹⁰, together with a carbon atom attached thereto and an adjacent carbon atom, forms an ethene-1,2-diyl, a bond represented by a solid line and a dotted line is a single bond or a double bond, R¹¹ represents a —C(═O)—NH₂ or a —CN, if R², R³, R⁴ and R⁵ satisfy conditions (i), R⁶ represents a hydrogen and R¹¹ represents a —C(=O)—NH₂, R¹ᵃ represents a halogen, and if R², R³, R⁴ and R⁵ satisfy conditions (i), R⁶ represents a hydrogen and R¹¹ represents a —CN, R¹ᵃ represents a hydrogen or a halogen, a stereoisomer thereof, a prodrug thereof, or a salt thereof, or a solvate thereof.

(16) The compound, a stereoisomer thereof, a prodrug thereof, or a salt thereof, or a solvate thereof according to embodiment (15), wherein R² represents a hydrogen or a substituted or unsubstituted C₁ to C₅ alkyl, R³ and R⁴ together form a —O—C(=O)—, wherein a carbon atom to which R³ is attached is bound to an O, and a carbon atom to which R⁴ is attached is bound to a C(=O), and R⁵ represents a hydrogen.

(17) The compound, a stereoisomer thereof, a prodrug thereof, or a salt thereof, or a solvate thereof according to according to embodiment (15), wherein R¹ᵃ represents a halogen, R² represents a hydrogen or a substituted or unsubstituted C₁ to C₅ alkyl, R³ and R⁴ together form a —O—C(=O)—, wherein a carbon atom to which R³ is attached is bound to an O, and a carbon atom to which R⁴ is attached is bound to a C(=O), R⁵ represents a hydrogen, and R¹¹ represents a —C(=O)—NH₂.

(18) The compound, a stereoisomer thereof, a prodrug thereof, or a salt thereof, or a solvate thereof according to embodiment (15), wherein the compound represented by formula (I), a stereoisomer thereof, a prodrug thereof, or a salt thereof, or a solvate thereof is 4-(((1S,4R,10S)-9-chloro-6-hydroxy-1-methyl-3,5-dioxo-1,3,4,5-tetrahydro-1,4-methanobenzo[c]oxepin-10-yl) methyl)-2,5-dihydro-3,6-dioxohexa-1,4-dienecarboxamide (compound Ia-1);

4-(((1S,4R,10S)-9-chloro-6-hydroxy-1-methyl-3,5-dioxo-1,3,4,5-tetrahydro-1,4-methanobenzo[c]oxepin-10-yl) methyl)-2,3,5,6-tetrahydroxybenzamide (compound Ia-2);

2,5-dihydroxy-4-(((1S,2S)-5-hydroxy-1-methyl-4-oxo-1,2,3,4-tetrahydronaphthalen-2-yl)methyl)-3,6-dioxocyclohexa-1,4-dienecarboxamide (compound Ia-3); or 2,5-dihydroxy-4-(((1S,4R,10S)-6-hydroxy-1-methyl-3,5-dioxo-1,3,4,5-tetrahydro-1,4-methanobenzo[c]oxepin-10-yl)methyl)-3,6-dioxocyclohexa-1,4-dienocarboxamide (compound Ia-4).

(19) A pharmaceutical composition comprising a compound represented by formula (I), a stereoisomer thereof, a prodrug thereof, or a pharmaceutically acceptable salt thereof, or a pharmaceutically acceptable solvate thereof and at least one pharmaceutically acceptable carrier, for use in prevention or treatment of a disease, symptom or disorder caused by opening of mitochondrial permeability transition pore (mPTP).

(20) The pharmaceutical composition according to embodiment (19), wherein the disease, symptom or disorder caused by opening of mitochondrial permeability transition pore (mPTP) is at least one selected from the group consisting of ischemia-reperfusion injury in percutaneous coronary angioplasty, abnormal engraftment or removal of a transplanted organ, a neurodegenerative disease and a mood disorder.

(21) The pharmaceutical composition according to embodiment (20), wherein the neurodegenerative disease is amyotrophic lateral sclerosis, Alzheimer's disease, Huntington's disease, Parkinson's disease or multiple sclerosis.

(22) The pharmaceutical composition according to embodiment (20), wherein the mood disorder is bipolar disorder or depression.

(23) The pharmaceutical composition according to embodiment (20), which is applied to an organ before transplantation in order to prevent abnormal engraftment or removal of a transplanted organ.

(24) A method for preventing or treating a disease, symptom or disorder caused by opening of mitochondrial permeability transition pore (mPTP), comprising administering an effective amount of a compound represented by formula (I), a stereoisomer thereof, a prodrug thereof, or a pharmaceutically acceptable salt thereof, or a pharmaceutically acceptable solvate thereof, to a subject in need of the prevention or treatment of the disease, symptom or disorder.

(25) The method according to embodiment (24), wherein the disease, symptom or disorder caused by opening of mitochondrial permeability transition pore (mPTP) is at least one selected from the group consisting of ischemia-reperfusion injury in percutaneous coronary angioplasty, abnormal engraftment or removal of a transplanted organ, a neurodegenerative disease and a mood disorder.

(26) The method according to embodiment (25), wherein the neurodegenerative disease is amyotrophic lateral sclerosis, Alzheimer's disease, Huntington's disease, Parkinson's disease, or multiple sclerosis.

(27) The method according to embodiment (25), wherein the mood disorder is bipolar disorder or depression.

(28) The method according to embodiment (25), which is applied to an organ before transplantation in order to prevent abnormal engraftment or removal of a transplanted organ.

(29) A compound represented by formula (I), a stereoisomer thereof, a prodrug thereof, or a pharmaceutically acceptable salt thereof, or a pharmaceutically acceptable solvate thereof, for use in prevention or treatment of a disease, symptom or disorder caused by opening of mitochondrial permeability transition pore (mPTP).

(30) The compound, a stereoisomer thereof, a prodrug thereof, or a pharmaceutically acceptable salt thereof, or a pharmaceutically acceptable solvate thereof according to embodiment (29), wherein the disease, symptom or disorder caused by opening of mitochondrial permeability transition pore (mPTP) is at least one selected from the group consisting of ischemia-reperfusion injury in percutaneous coronary angioplasty, abnormal engraftment or removal of a transplanted organ, a neurodegenerative disease and a mood disorder.

(31) The compound, a stereoisomer thereof, a prodrug thereof, or a pharmaceutically acceptable salt thereof, or a pharmaceutically acceptable solvate thereof according to embodiment (30), wherein the neurodegenerative disease is amyotrophic lateral sclerosis, Alzheimer's disease, Huntington's disease, Parkinson's disease, or multiple sclerosis.

(32) The compound, a stereoisomer thereof, a prodrug thereof, or a pharmaceutically acceptable salt thereof, or a pharmaceutically acceptable solvate thereof according to embodiment (30), wherein the mood disorder is bipolar disorder or depression.

(33) The compound, a stereoisomer thereof, a prodrug thereof, or a pharmaceutically acceptable salt thereof, or a pharmaceutically acceptable solvate thereof according to embodiment (30), which is applied to an organ before transplantation in order to prevent abnormal engraftment or removal of a transplanted organ.

(34) Use of a compound represented by formula (I), a stereoisomer thereof, a prodrug thereof, or a pharmaceutically acceptable salt thereof, or a pharmaceutically acceptable solvate thereof in the manufacture of a medicament for prevention or treatment of a disease, symptom or disorder caused by opening of mitochondrial permeability transition pore (mPTP).

(35) The use according to embodiment (34), wherein the disease, symptom or disorder caused by opening of mitochondrial permeability transition pore (mPTP) is at least one selected from the group consisting of ischemia-reperfusion injury in percutaneous coronary angioplasty, abnormal engraftment or removal of a transplanted organ, a neurodegenerative disease and a mood disorder.

(36) The use according to embodiment (35), wherein the neurodegenerative disease is amyotrophic lateral sclerosis, Alzheimer's disease, Huntington's disease, Parkinson's disease, or multiple sclerosis.

(37) The use according to embodiment (35), wherein the mood disorder is bipolar disorder or depression.

(38) The use according to embodiment (35), which is applied to an organ before transplantation in order to prevent abnormal engraftment or removal of a transplanted organ.

Advantageous Effects of Invention

The present invention makes it possible to provide a novel compound having a high mPTP-opening inhibitory activity and/or a useful therapeutic effect on various diseases.

Problems, constitutions and effects except those mentioned above will be clearly understood by the following descriptions of embodiments.

The specification incorporates the contents described in the specification and drawings of JP Application No. 2019-112568, which is a base of the priority of the present application.

DESCRIPTION OF EMBODIMENTS

Figure 1:
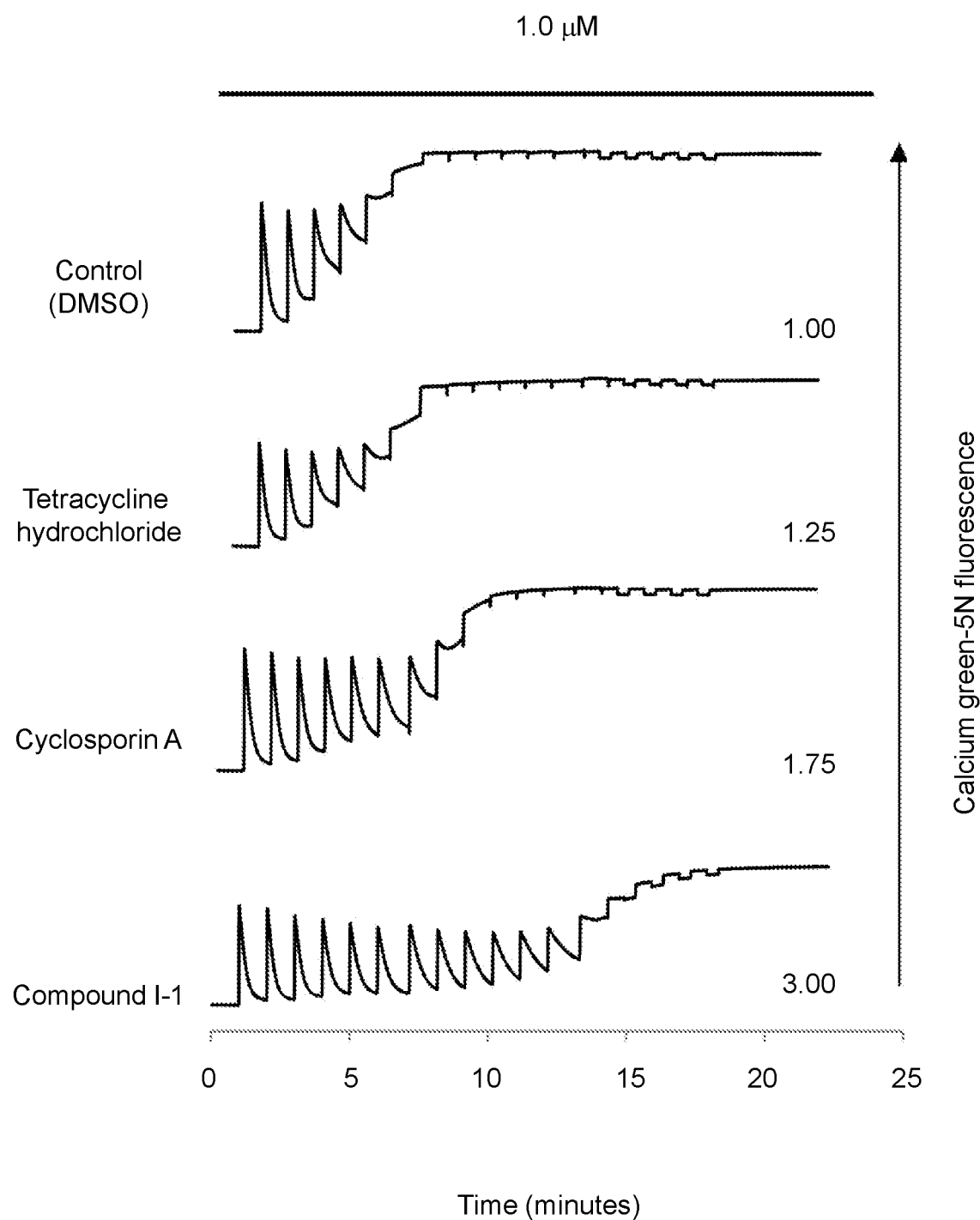
FIG. 1 shows the time-dependent change of calcium concentration in a mPTP-opening inhibitory activity test performed in the presence and absence of a test compound.

Now, preferred embodiments of the present invention will be more specifically described.
<1. Compound>

In the specification, "alkyl" refers to a linear or branched saturated aliphatic hydrocarbon group containing a predetermined number of carbon atoms. For example, "$C_1$ to $C_5$ alkyl" refers to a linear or branched saturated aliphatic hydrocarbon group containing at least one and at most five carbon atoms. Examples of a preferable alkyl include, but are not limited to, linear or branched $C_1$ to $C_5$ alkyls such as methyl, ethyl, n-propyl, isopropyl, n-butyl, sec-butyl, isobutyl, tert-butyl and n-pentyl.

In the specification, "alkenyl" refers to a group obtained by substituting at least one C—C single bond of an alkyl as mentioned above with a double bond. Examples of a preferable alkenyl include, but are not limited to, linear or branched $C_2$ to $C_5$ alkenyls such as vinyl, 1-propenyl, allyl, 1-methylethenyl (isopropenyl), 1-butenyl, 2-butenyl, 3-butenyl, 1-methyl-2-propenyl, 2-methyl-2-propenyl, 1-methyl-1-propenyl, 2-methyl-1-propenyl, 3-methylbut-2-en-1-yl and 1-pentenyl.

In the specification, "alkynyl" refers to a group obtained by substituting at least one C—C single bond of an alkyl as mentioned above with a triple bond. Examples of a preferable alkynyl include, but are not limited to, linear or branched $C_2$ to $C_5$ alkynyls such as ethynyl, 1-propynyl, 2-propynyl, 1-butynyl, 2-butynyl, 3-butynyl, 1-methyl-2-propynyl and 1-pentynyl.

In the specification, "cycloalkyl" refers to an alicyclic alkyl containing a predetermined number of carbon atoms. For example, "$C_3$ to $C_6$ cycloalkyl" refers to a cyclic hydrocarbon group containing at least 3 and at most 6 carbon atoms. Examples of preferable cycloalkyl group include, but are not limited to, $C_3$ to $C_6$ cycloalkyls such as cyclopropyl, cyclobutyl, cyclopentyl and cyclohexyl.

In the specification, "cycloalkenyl" refers to a group obtained by substituting at least one C—C single bond of a cycloalkyl as mentioned above with a double bond. Examples of a preferable cycloalkenyl include, but are not limited to, $C_4$ to $C_6$ cycloalkenyls such as cyclobutenyl, cyclopentenyl and cyclohexenyl.

In the specification, "cycloalkynyl" refers to a group obtained by substituting at least one C—C single bond of a cycloalkyl as mentioned above with a triple bond. Examples of a preferable cycloalkynyl include, but are not limited to, $C_4$ to $C_6$ cycloalkynyls such as cyclobutynyl, cyclopentynyl and cyclohexynyl.

In the specification, "heterocycloalkyl" refers to a group obtained by substituting one or more carbon atoms of a cycloalkyl, cycloalkenyl or cycloalkynyl as mentioned above each independently with at least one heteroatom selected from the group consisting of nitrogen (N), sulfur (S) and oxygen (O). In this case, examples of the substitution with N and S include substitution with an N-oxide, and substitution with an S oxide or dioxide. Examples of a preferable heterocycloalkyl include, but are not limited to, 3- to 6-membered heterocycloalkyls such as pyrrolidinyl, tetrahydrofuranyl, dihydrofuranyl, tetrahydrothienyl, tetrahydropyranyl, dihydropyranyl, tetrahydrothiopyranyl, piperidinyl, morpholinyl, thiomorpholinyl and piperazinyl. Examples of a preferable heterocycloalkenyl include, but are not limited to, 5- or 6-membered heterocycloalkenyls such as dihydropyrrole and tetrahydropyridine.

In the specification, "cycloalkylalkyl" refers to a group obtained by substituting a single hydrogen atom of an alkyl, alkenyl or alkynyl as mentioned above with a cycloalkyl, cycloalkenyl or cycloalkynyl as mentioned above. Examples of a preferable cycloalkylalkyl include, but are not limited to, $C_7$ to $C_{11}$ cycloalkylalkyls such as cyclohexylmethyl and cyclohexenylmethyl.

In the specification, "heterocycloalkylalkyl" refers to a group obtained by substituting a single hydrogen atom of an alkyl, alkenyl or alkynyl as mentioned above with a single heterocycloalkyl as mentioned above. Examples of a preferable heterocycloalkylalkyl include, but are not limited to, 3- to 6-membered heterocycloalkyl-$C_1$ to $C_5$ alkyls.

In the specification, "alkoxy" refers to a group obtained by substituting the hydrogen atom of a hydroxyl with an alkyl, alkenyl or alkynyl as mentioned above. Examples of a preferable alkoxy include, but are not limited to, $C_1$ to $C_5$ alkoxys such as methoxy, ethoxy, propoxy, butoxy and pentoxy.

In the specification, "cycloalkoxy" refers to a group obtained by substituting the hydrogen atom of a hydroxyl with a cycloalkyl, cycloalkenyl or cycloalkynyl as mentioned above. Examples of a preferable cycloalkoxy include, but are not limited to, $C_3$ to $C_6$ cycloalkoxys such as cyclopropoxy, cyclobutoxy and cyclopentoxy.

In the specification, "heterocycloalkoxy" refers to a group obtained by substituting the hydrogen atom of a hydroxyl with a heterocycloalkyl as mentioned above. Examples of a preferable cycloalkoxy include, but are not limited to, 3- to 6-membered heterocycloalkoxys.

In the specification, "aryl" refers to an aromatic ring group. Examples of a preferable aryl include, but are not limited to, $C_6$ to Cis aryls such as phenyl, biphenyl, terphenyl, naphthyl and anthracenyl.

In the specification, "arylalkyl" refers to a group obtained by substituting a single hydrogen atom of an alkyl, alkenyl or alkynyl as mentioned above with an aryl as mentioned above. Examples of a preferable arylalkyl include, but are not limited to, $C_7$ to $C_{20}$ arylalkyls such as benzyl, 1-phenethyl, 2-phenethyl, biphenylmethyl, terphenylmethyl and styryl.

In the specification, "heteroaryl" refers to a group obtained by substituting one or more carbon atoms of an aryl as mentioned above each independently with one or more heteroatoms selected from N, S and O. In this case, examples of the substitution with N and S include substitution with an N-oxide, and substitution with an S oxide or dioxide. Examples of a preferable heteroaryl include, but are not limited to, 5- to 15-membered heteroaryls such as furanyl, thienyl (thiophenyl), pyrrolyl, imidazolyl, pyrazolyl, triazolyl, tetrazolyl, thiazolyl, oxazolyl, isooxazolyl, oxadiazolyl, thiadiazolyl, isothiazolyl, pyridyl, pyridazinyl, pyrazinyl, pyrimidinyl, quinolinyl, isoquinolinyl and indolyl.

In the specification, "heteroarylalkyl" refers to a group obtained by substituting a single hydrogen atom of an alkyl, alkenyl or alkynyl as mentioned above with a heteroaryl as mentioned above. Examples of a preferable heteroarylalkyl include, but are not limited to, 5- to 15-membered heteroaryl-$C_1$ to $C_5$ alkyls such as pyridylmethyl.

In the specification, "aryloxy" refers to a group obtained by substituting the hydrogen atom of a hydroxyl with an aryl as mentioned above. Examples of a preferable aryloxy include, but are not limited to, $C_6$ to $C_{15}$ aryloxys such as phenoxy, biphenyloxy, naphthyloxy and anthryloxy (anthrasenyloxy).

In the specification, "arylalkyloxy" refers to a group obtained by substituting the hydrogen atom of a hydroxyl with an arylalkyl as mentioned above. Examples of a preferable arylalkyloxy include, but are not limited to, $C_7$ to $C_{20}$ arylalkyloxys such as benzyloxy, 1-phenethyloxy, 2-phenethyloxy and styryloxy.

In the specification, "heteroaryloxy" refers to a group obtained by substituting the hydrogen atom of a hydroxyl with a heteroaryl as mentioned above. Examples of a preferable heteroaryloxy include, but are not limited to, 5- to 15-membered heteroaryloxys such as furanyloxy, thienyloxy (thiophenyloxy), pyrrolyloxy, imidazolyloxy, pyrazolyloxy, triazolyloxy, tetrazolyloxy, thiazolyloxy, oxazolyloxy, isooxazolyloxy, oxadiazolyloxy, thiadiazolyloxy, isothiazolyloxy, pyridyloxy, pyridazinyloxy, pyrazinyloxy, pyrimidinyloxy, quinolinyloxy, isoquinolinyloxy and indolyloxy.

In the specification, "heteroarylalkyloxy" refers to a group obtained by substituting the hydrogen atom of a hydroxyl with a heteroarylalkyl as mentioned above. Examples of a preferable heteroarylalkyloxy include, but are not limited to, 5- to 15-membered heteroaryl-$C_1$ to $C_5$ alkyloxys.

In the specification, "acyl" refers to a group obtained by connecting a monovalent group selected from the groups mentioned above with a carbonyl. Examples of a preferable acyl include, but are not limited to, $C_1$ to $C_{20}$ acyls including $C_1$ to $C_5$ aliphatic acyls such as formyl, acetyl and propionyl, and $C_7$ to $C_{20}$ aromatic acyls such as benzoyl.

The groups as mentioned above are each independently unsubstituted or can be further substituted with a single or a plurality of monovalent groups as mentioned above.

In the specification, "halogen" or "halo" refers to fluorine (F), chlorine ($C_1$), bromine (Br) or iodine (I).

An aspect of the present invention relates to a mPTP-opening inhibitor comprising a compound represented by formula (I):

[Formula 4]

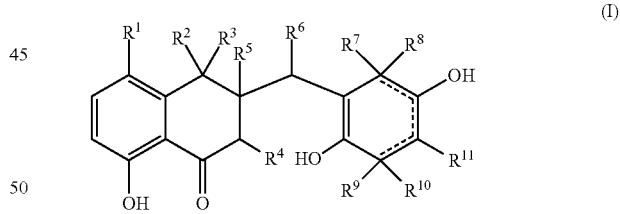

(I)

a stereoisomer thereof, a prodrug thereof, or a pharmaceutically acceptable salt thereof, or a pharmaceutically acceptable solvate thereof, as an active ingredient.

The present inventors have found that specific analogs of tetracycline known as an antibiotic substance have a high mPTP-opening inhibitory activity. They have also found that the specific analogs of tetracycline can exert a therapeutic effect on diseases, symptoms or disorders caused by opening of mPTP.

Specific analogs of tetracycline, which are included in the compounds represented by formula (I) according to an aspect of the present invention, are known as a compound having antibacterial activity or UV absorbance (e.g. U.S. Pat. Nos. 3,330,841, 3,438,999 and 3,462,487) but have not been known to have high mPTP-opening inhibitory activity.

A compound represented by formula (I) according to an aspect of the present invention may have a higher mPTP-opening inhibitory activity, higher water solubility and/or more satisfactory pharmacokinetic properties than conventional mPTP-opening inhibitors including cyclosporine A. Thus, a compound represented by formula (I) according to an aspect of the present invention may have a high mPTP-opening inhibitory activity and/or a useful therapeutic effect on diseases, symptoms or disorders caused by opening of mPTP.

In formula (I), $R^1$ represents a hydrogen, a halogen, or a substituted or unsubstituted amino. $R^1$ preferably represents a hydrogen or a halogen and more preferably a hydrogen. If $R^1$ represents a group mentioned above, a compound represented by formula (I) according to an aspect of the present invention may have a high mPTP-opening inhibitory activity and/or a useful therapeutic effect on diseases, symptoms or disorders caused by opening of mPTP.

In formula (I), $R^2$, $R^3$, $R^4$ and $R^5$ satisfy either one of the following conditions (i) and (ii):

(i)
  $R^2$ represents a hydrogen or a substituted or unsubstituted $C_1$ to $C_5$ alkyl,
  $R^3$ and $R^4$ together form a —O—C(=O)—, wherein a carbon atom to which $R^3$ is attached is bound to an O, and a carbon atom to which $R^4$ is attached is bound to a C(=O), and
  $R^5$ represents a hydrogen,
(ii)
  $R^2$ represents a hydrogen or a substituted or unsubstituted $C_1$ to $C_5$ alkyl, and
  $R^3$, $R^4$ and $R^5$ each represent a hydrogen.

It is preferable that $R^2$, $R^3$, $R^4$ and $R^5$ satisfy the conditions (i). If $R^2$, $R^3$, $R^4$ and $R^5$ represent the groups mentioned above, a compound represented by formula (I) according to an aspect of the present invention may have a high mPTP-opening inhibitory activity and/or a useful therapeutic effect on diseases, symptoms or disorders caused by opening of mPTP.

In the case of an embodiment where $R^2$, $R^3$, $R^4$ and $R^5$ in formula (I) satisfy the condition (i) or (ii), $R^2$ preferably represents a hydrogen or an unsubstituted $C_1$ to $C_5$ alkyl; more preferably a hydrogen, a methyl, an ethyl, a n-propyl, an isopropyl, a n-butyl, a sec-butyl, an isobutyl, a tert-butyl or a n-pentyl; further preferably a hydrogen or a methyl; and particularly preferably a methyl. If $R^2$ represents a group as mentioned above, a compound represented by formula (I) according to an aspect of the present invention may have a high mPTP-opening inhibitory activity and/or a useful therapeutic effect on diseases, symptoms or disorders caused by opening of mPTP.

In formula (I), $R^6$ represents a hydrogen or a hydroxyl. $R^6$ preferably represents a hydrogen. If $R^6$ represents a group as mentioned above, a compound represented by formula (I) according to an aspect of the present invention may have a high mPTP-opening inhibitory activity and/or a useful therapeutic effect on diseases, symptoms or disorders caused by opening of mPTP.

In formula (I), $R^7$, $R^8$, $R^9$ and $R^{10}$ satisfy either one of the following conditions (xi) and (xii):

(xi)
  $R^7$ and $R^8$ together form an oxo (=O), and
  $R^9$ and $R^{10}$ together form an oxo (=O),
(xii)
  $R^7$ and $R^9$ each represent a hydroxyl,
  $R^8$, together with a carbon atom attached thereto and an adjacent carbon atom, forms an ethene-1,2-diyl (>C=C<), and
  $R^{10}$, together with a carbon atom attached thereto and an adjacent carbon atom, forms an ethene-1,2-diyl (>C=C<), and
  a bond represented by a solid line and a dotted line is a single bond or a double bond.

$R^7$, $R^8$, $R^9$ and $R^{10}$ preferably satisfy the conditions (xi). If $R^7$, $R^8$, $R^9$ and $R^{10}$ represent groups as mentioned above, a compound represented by formula (I) according to an aspect of the present invention may have a high mPTP-opening inhibitory activity and/or a useful therapeutic effect on diseases, symptoms or disorders caused by opening of mPTP.

In formula (I), $R^{11}$ represents a —C(=O)—NH$_2$ or a —CN. $R^{11}$ preferably represents a —C(=O)—NH$_2$. If $R^{11}$ represents a group as mentioned above, a compound represented by formula (I) according to an aspect of the present invention may have a high mPTP-opening inhibitory activity and/or a useful therapeutic effect on diseases, symptoms or disorders caused by opening of mPTP.

In formula (I) and formula (Ia) described below, if individual groups therein are substituted, unless otherwise specified, the substituents each independently represent at least one monovalent group or divalent group selected from the group consisting of a halogen (fluorine, chlorine, bromine or iodine), a cyano, a nitro, a hydroxyl, a substituted or unsubstituted alkyl, a substituted or unsubstituted alkenyl, a substituted or unsubstituted alkynyl, a substituted or unsubstituted cycloalkyl, a substituted or unsubstituted cycloalkenyl, a substituted or unsubstituted cycloalkynyl, a substituted or unsubstituted heterocycloalkyl, a substituted or unsubstituted cycloalkylalkyl, a substituted or unsubstituted heterocycloalkylalkyl, a substituted or unsubstituted aryl, a substituted or unsubstituted arylalkyl, a substituted or unsubstituted heteroaryl, a substituted or unsubstituted heteroarylalkyl, a substituted or unsubstituted alkoxy, a substituted or unsubstituted cycloalkoxy, a substituted or unsubstituted heterocycloalkoxy, a substituted or unsubstituted aryloxy, a substituted or unsubstituted arylalkyloxy, a substituted or unsubstituted heteroaryloxy, a substituted or unsubstituted heteroarylalkyloxy, a substituted or unsubstituted alkoxycarbonyl, a substituted or unsubstituted cycloalkoxycarbonyl, a substituted or unsubstituted aminocarbonyl (carbamoyl), a substituted or unsubstituted acyl, a substituted or unsubstituted acyloxy, a substituted or unsubstituted amino, a substituted or unsubstituted sulfonamide, a substituted or unsubstituted carbonyl diimino, a carboxyl and an oxo; more preferably at least one monovalent or divalent group selected from the group consisting of a halogen (fluorine, chlorine, bromine or iodine), a cyano, a nitro, a hydroxyl, a substituted or unsubstituted $C_1$ to $C_5$ alkyl, a substituted or unsubstituted $C_2$ to $C_5$ alkenyl, a substituted or unsubstituted $C_2$ to $C_5$ alkynyl, a substituted or unsubstituted $C_3$ to $C_6$ cycloalkyl, a substituted or unsubstituted $C_3$ to $C_6$ cycloalkenyl, a substituted or unsubstituted $C_3$ to $C_6$ cycloalkynyl, a substituted or unsubstituted 3- to 6-membered heterocycloalkyl, a substituted or unsubstituted $C_7$ to $C_{11}$ cycloalkylalkyl, a substituted or unsubstituted 3- to 6-membered heterocycloalkyl-$C_1$ to $C_5$ alkyl, a substituted or unsubstituted $C_6$ to $C_{15}$ aryl, a substituted or unsubstituted $C_7$ to $C_{20}$ arylalkyl, a substituted or unsubstituted 5- to 15-membered heteroaryl, a substituted or unsubstituted 5- to 15-membered heteroaryl-$C_1$ to $C_5$ alkyl, a substituted or unsubstituted $C_1$ to $C_6$ alkoxy, a substituted or unsubstituted $C_3$ to $C_6$ cycloalkoxy, a substituted or unsubstituted 3 to 6 heterocycloalkoxy, a substituted or unsubstituted $C_6$ to $C_{15}$ aryloxy, a substituted or unsubstituted $C_7$ to $C_{20}$ arylalkyloxy, a substituted or unsubstituted 5- to 15-membered heteroaryloxy, a substituted or unsubstituted 5- to 15-membered heteroaryl-$C_1$ to $C_5$ alkyloxy, a substituted or unsubstituted $C_1$ to $C_6$ alkoxycarbonyl, a substituted or unsubstituted $C_3$ to $C_6$ cycloalkoxycarbonyl, a substituted or unsubstituted aminocarbonyl (carbamoyl), a substituted or unsubstituted $C_1$ to $C_{20}$ acyl, a substituted or unsubstituted $C_1$ to $C_{20}$ acyloxy, a substituted or unsubstituted amino, a substituted or unsubstituted sulfonamide, a substituted or unsubstituted carbonyl diimino, a carboxyl and an oxo; and further preferably at least one monovalent or divalent group selected from the group consisting of a halogen (fluorine, chlorine, bromine or iodine), a cyano, a nitro, a hydroxyl, a carboxyl and an oxo. If the monovalent group is substituted, the substituent may be further selected from a monovalent group and a divalent group.

The compound represented by formula (I) according to an aspect of the present invention may include a compound defined by any one of the combinations of $R^1$, $R^2$, $R^3$, $R^4$, $R^5$, $R^6$, $R^7$, $R^8$, $R^9$, $R^{10}$ and $R^{11}$.

In a compound represented by formula (I), preferably,
$R^1$ represents a hydrogen, a halogen, or a substituted or unsubstituted amino,
$R^2$, $R^3$, $R^4$ and $R^5$ satisfy the following conditions (i) and (ii):
(i)
$R^2$ represents a hydrogen or a substituted or unsubstituted $C_1$ to $C_5$ alkyl,
$R^3$ and $R^4$ together form a —O—C(=O)—, wherein a carbon atom to which $R^3$ is attached is bound to an O, and a carbon atom to which $R^4$ is attached is bound to a C(=O), and
$R^5$ represents a hydrogen,
(ii)
$R^2$ represents a hydrogen or a substituted or unsubstituted $C_1$ to $C_5$ alkyl, and
$R^3$, $R^4$ and $R^5$ each represent a hydrogen,
$R^6$ represents a hydrogen or a hydroxyl, and
$R^7$, $R^8$, $R^9$ and $R^{10}$ satisfy either one of the following conditions (xi) and (xii):
(xi)
$R^7$ and $R^8$ together form an oxo (=O), and
$R^9$ and $R^{10}$ together form an oxo (=O),
(xii)
$R^7$ and $R^9$ each represent a hydroxyl,
$R^8$, together with a carbon atom attached thereto and an adjacent carbon atom, forms an ethene-1,2-diyl (>C=C<), and
$R^{10}$, together with a carbon atom attached thereto and an adjacent carbon atom, forms an ethene-1,2-diyl (>C=C<),
a bond represented by a solid line and a dotted line is a single bond or a double bond,
$R^{11}$ represents a —C(=O)—NH$_2$ or —CN, and
if the groups mentioned above are substituted, unless otherwise specified, the substituents each independently represent at least one monovalent group or divalent group selected from the group consisting of a halogen (fluorine, chlorine, bromine or iodine), a cyano, a nitro, a hydroxyl, a substituted or unsubstituted $C_1$ to $C_5$ alkyl, a substituted or unsubstituted $C_2$ to $C_5$ alkenyl, a substituted or unsubstituted $C_2$ to $C_5$ alkynyl, a substituted or unsubstituted $C_3$ to $C_6$ cycloalkyl, a substituted or unsubstituted $C_3$ to $C_6$ cycloalkenyl, a substituted or unsubstituted $C_3$ to $C_6$ cycloalkynyl, a substituted or unsubstituted 3- to 6-membered heterocycloalkyl, a substituted or unsubstituted $C_7$ to $C_{11}$ cycloalkylalkyl, a substituted or unsubstituted 3- to 6-membered heterocycloalkyl-$C_1$ to $C_5$ alkyl, a substituted or unsubstituted $C_6$ to $C_{15}$ aryl, a substituted or unsubstituted $C_7$ to $C_{20}$ arylalkyl, a substituted or unsubstituted 5- to 15-membered heteroaryl, a substituted or unsubstituted 5- to 15-membered heteroaryl-$C_1$ to $C_5$ alkyl, a substituted or unsubstituted $C_1$ to $C_6$ alkoxy, a substituted or unsubstituted $C_3$ to $C_6$ cycloalkoxy, a substituted or unsubstituted 3 to 6 heterocycloalkoxy, a substituted or unsubstituted $C_6$ to $C_{15}$ aryloxy, a substituted or unsubstituted $C_7$ to $C_{20}$ arylalkyloxy, a substituted or unsubstituted 5- to 15-membered heteroaryloxy, a substituted or unsubstituted 5- to 15-membered heteroaryl-$C_1$ to $C_5$ alkyloxy, a substituted or unsubstituted $C_1$ to $C_6$ alkoxycarbonyl, a substituted or unsubstituted $C_3$ to $C_6$ cycloalkoxycarbonyl, a substituted or unsubstituted aminocarbonyl (carbamoyl), a substituted or unsubstituted $C_1$ to $C_{20}$ acyl, a substituted or unsubstituted $C_1$ to $C_{20}$ acyloxy, a substituted or unsubstituted amino, a substituted or unsubstituted sulfonamide, a substituted or unsubstituted carbonyl diimino, a carboxyl and an oxo. The monovalent group or divalent group is usually unsubstituted. If the monovalent group or divalent group is substituted, the substituent is preferably further selected from the monovalent groups or divalent groups as mentioned above and more preferably further selected from the unsubstituted monovalent groups or divalent groups as mentioned above.

In a compound represented by formula (I), more preferably,
$R^1$ represents a hydrogen or a halogen,
$R^2$, $R^3$, $R^4$ and $R^5$ satisfy the following conditions (i) and (ii)
(i)
$R^2$ represents a hydrogen or a substituted or unsubstituted $C_1$ to $C_5$ alkyl,
$R^3$ and $R^4$ together form a —O—C(=O)—, wherein a carbon atom to which $R^3$ is attached is bound to an O, and a carbon atom to which $R^4$ is attached is bound to a C(=O), and
$R^5$ represents a hydrogen,
(ii)
$R^2$ represents a hydrogen or a substituted or unsubstituted $C_1$ to $C_5$ alkyl, and
$R^3$, $R^4$ and $R^5$ each represent a hydrogen,
$R^6$ represents a hydrogen, and
$R^7$, $R^8$, $R^9$ and $R^{10}$ satisfy either one of the following conditions (xi) and (xii):
(xi)
$R^7$ and $R^8$ together form an oxo (=O), and
$R^9$ and $R^{10}$ together form an oxo (=O),
(xii)
$R^7$ and $R^9$ each represent a hydroxyl,
$R^8$, together with a carbon atom attached thereto and an adjacent carbon atom, forms an ethene-1,2-diyl (>C=C<), and
$R^{10}$, together with a carbon atom attached thereto and an adjacent carbon atom, forms an ethene-1,2-diyl (>C=C<), a bond represented by a solid line and a dotted line is a single bond or a double bond,
$R^{11}$ represents a C(=O)—NH$_2$ or a —CN, and
if the groups mentioned above are substituted, unless otherwise specified, the substituents each independently represent at least one monovalent group or divalent group selected from the group consisting of a halogen (fluorine, chlorine, bromine or iodine), a cyano, a nitro, a hydroxyl, a substituted or unsubstituted $C_1$ to $C_5$ alkyl, a substituted or unsubstituted $C_2$ to $C_5$ alkenyl, a substituted or unsubstituted $C_2$ to $C_5$ alkynyl, a substituted or unsubstituted $C_3$ to $C_6$ cycloalkyl, a substituted or unsubstituted $C_3$ to $C_6$ cycloalkenyl, a substituted or unsubstituted $C_3$ to $C_6$ cycloalkynyl, a substituted or unsubstituted 3- to 6-membered heterocycloalkyl, a substituted or unsubstituted $C_7$ to $C_{11}$ cycloalkylalkyl, a substituted or unsubstituted 3- to 6-membered heterocycloalkyl-$C_1$ to $C_5$ alkyl, a substituted or unsubstituted $C_6$ to $C_{15}$ aryl, a substituted or unsubstituted $C_7$ to $C_{20}$ arylalkyl, a substituted or unsubstituted 5- to 15-membered heteroaryl, a substituted or unsubstituted 5- to 15-membered heteroaryl-$C_1$ to $C_5$ alkyl, a substituted or unsubstituted $C_1$ to $C_6$ alkoxy, a substituted or unsubstituted $C_3$ to $C_6$ cycloalkoxy, a substituted or unsubstituted 3 to 6 heterocycloalkoxy, a substituted or unsubstituted $C_6$ to $C_{15}$ aryloxy, a substituted or unsubstituted $C_7$ to $C_{20}$ arylalkyloxy, a substituted or unsubstituted 5- to 15-membered heteroaryloxy, a substituted or unsubstituted 5- to 15-membered heteroaryl-$C_1$ to $C_5$ alkyloxy, a substituted or unsubstituted $C_1$ to $C_6$ alkoxycarbonyl, a substituted or unsubstituted $C_3$ to $C_6$ cycloalkoxycarbonyl, a substituted or unsubstituted aminocarbonyl (carbamoyl), a substituted or unsubstituted $C_1$ to $C_{20}$ acyl, a substituted or unsubstituted $C_1$ to $C_{20}$ acyloxy, a substituted or unsubstituted amino, a substituted or unsubstituted sulfonamide, a substituted or unsubstituted carbonyl diimino, a carboxyl and an oxo. The monovalent group or divalent group is usually unsubstituted. If the monovalent group or divalent group is substituted, the substituent is preferably further selected from the monovalent groups or divalent groups and more preferably further selected from the unsubstituted monovalent groups or divalent groups.

In a compound represented by formula (I), further preferably, $R^1$ represents a hydrogen or a halogen,
$R^2$, $R^3$, $R^4$ and $R^5$ satisfy the following conditions (i) and (ii):
(i)
  $R^2$ represents a hydrogen, a methyl, an ethyl, a n-propyl, an isopropyl, a n-butyl, a sec-butyl, an isobutyl, a tert-butyl or a n-pentyl,
  $R^3$ and $R^4$ together form a —O—C(═O)—, wherein a carbon atom to which $R^3$ is attached is bound to an O, and a carbon atom to which $R^4$ is attached is bound to a C(═O), and
  $R^5$ represents a hydrogen,
(ii)
  $R^2$ represents a hydrogen, a methyl, an ethyl, a n-propyl, an isopropyl, a n-butyl, a sec-butyl, an isobutyl, a tert-butyl or a n-pentyl, and
  $R^3$, $R^4$ and $R^5$ each represent a hydrogen,
$R^6$ represents a hydrogen, and
$R^7$, $R^8$, $R^9$ and $R^{10}$ satisfy either one of the following conditions (xi) and (xii):
(xi)
  $R^7$ and $R^8$ together form an oxo (═O), and
  $R^9$ and $R^{10}$ together form an oxo (═O),
(xii)
  $R^7$ and $R^9$ each represent a hydroxyl,
  $R^8$, together with a carbon atom attached thereto and an adjacent carbon atom, forms an ethene-1,2-diyl (>C═C<), and
  $R^{10}$, together with a carbon atom attached thereto and an adjacent carbon atom, forms an ethene-1,2-diyl (>C═C<), a bond represented by a solid line and a dotted line is a single bond or a double bond, and
$R^{11}$ represents a —C(═O)—NH$_2$ or a —CN.

In a compound represented by formula (I), particularly preferably, $R^1$ represents a hydrogen,
$R^2$, $R^3$, $R^4$ and $R^5$ satisfy the following conditions (i) and (ii)
(i)
  $R^2$ represents a hydrogen or a methyl,
  $R^3$ and $R^4$ together form a —O—C(═O)—, wherein a carbon atom to which $R^3$ is attached is bound to an O, and a carbon atom to which $R^4$ is attached is bound to a C(═O), and
  $R^5$ represents a hydrogen,
(ii)
  $R^2$ represents a hydrogen or methyl, and
  $R^3$, $R^4$ and $R^5$ each represent a hydrogen,
$R^6$ represents a hydrogen, and
$R^7$, $R^8$, $R^9$ and $R^{10}$ satisfy either one of the following conditions (xi) and (xii):
(xi)
  $R^7$ and $R^8$ together form an oxo (═O), and
  $R^9$ and $R^{10}$ together form an oxo (═O),
(xii)
  $R^7$ and $R^9$ each represent a hydroxyl,
  $R^8$, together with a carbon atom attached thereto and an adjacent carbon atom, forms an ethene-1,2-diyl (>C═C<), and
  $R^{10}$, together with a carbon atom attached thereto and an adjacent carbon atom, forms an ethene-1,2-diyl (>C═C<), a bond represented by a solid line and a dotted line is a single bond or a double bond, and
$R^{11}$ represents a —C(═O)—NH$_2$ or a —CN.

Most particularly preferably, a compound represented by formula (I), a stereoisomer thereof, a prodrug thereof, or a pharmaceutically acceptable salt thereof, or a pharmaceutically acceptable solvate thereof is selected from the group consisting of:

2,5-dihydroxy-4-(((1S,4R,10S)-6-hydroxy-1-methyl-3,5-dioxo-1,3,4,5-tetrahydro-1,4-methanobenzo[c]oxepin-10-yl)methyl)-3,6-dioxocyclohexa-1,4-dienocarboxamide (compound I-1);

2,3,5,6-tetrahydroxy-4-(((1S,4R,10S)-6-hydroxy-1-methyl-3,5-dioxo-1,3,4,5-tetrahydro-1,4-methanobenzo[c]oxepin-10-yl)methyl)benzamide (compound I-2);

4-((8-(dimethylamino)-5-hydroxy-4-oxo-1,2,3,4-tetrahydronaphthalen-2-yl)methyl)-2,5-dihydroxy-3,6-dioxocyclohexa-1,4-dienecarboxamide (compound I-3);

3-(((1S,4R,10S)-6-acetoxy-1-methyl-3,5-dioxo-1,3,4,5-tetrahydro-1,4-methanobenzo[c]oxepin-10-yl)methyl)-6-carbamoyl benzene-1,2,4,5-tetraryl tetraacetate (compound I-4);

3-carbamoyl-6-(((1S,4R,10S)-1-methyl-3,5-dioxo-6-(pivaloyloxy)-1,3,4,5-tetrahydro-1,4-methanobenzo[c]oxepin-10-yl)methyl)benzene-1,2,4,5-tetraryl tetrakis(2,2-dimethylpropanoate)(compound I-5);

3-(((1S,4R,10S)-6-(benzoyloxy)-1-methyl-3,5-dioxo-1,3,4,5-tetrahydro-1,4-methanobenzo[c]oxepin-10-yl)methyl)-6-carbamoyl benzene-1,2,4,5-tetraryl tetrabenzoate) (compound I-6);

4-(((1S,4R,10S)-9-chloro-6-hydroxy-1-methyl-3,5-dioxo-1,3,4,5-tetrahydro-1,4-methanobenzo[c]oxepin-10-yl)methyl)-2,5-dihydro-3,6-dioxohexa-1,4-dienecarboxamide (compound Ia-1);

4-(((1S,4R,10S)-9-chloro-6-hydroxy-1-methyl-3,5-dioxo-1,3,4,5-tetrahydro-1,4-methanobenzo[c]oxepin-10-yl)methyl)-2,3,5,6-tetrahydroxybenzamide (compound Ia-2);

2,5-dihydroxy-4-(((1S,2S)-5-hydroxy-1-methyl-4-oxo-1,2,3,4-tetrahydronaphthalen-2-yl)methyl)-3,6-dioxocyclohexa-1,4-dienecarboxamide (compound Ia-3); and 2,5-dihydroxy-4-(((1S,4R,10S)-6-hydroxy-1-methyl-3,5-dioxo-1,3,4,5-tetrahydro-1,4-methanobenzo[c]oxepin-10-yl)methyl)-3,6-dioxocyclohexa-1,4-dienocarboxamide (compound Ia-4).

A compound represented by formula (I) according to an aspect of the present invention having the characteristics mentioned above may have a high mPTP-opening inhibitory activity and/or a useful therapeutic effect on diseases, symptoms or disorders caused by opening of mPTP.

Another aspect of the present invention relates to a compound represented by formula (Ia):

[Formula 5]

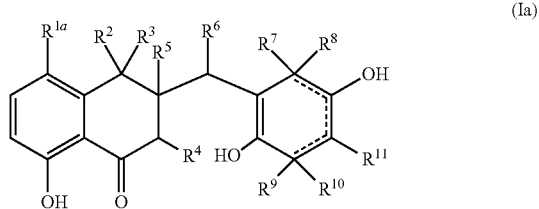

(Ia)

a stereoisomer thereof, a prodrug thereof, or a salt thereof, or a solvate thereof.

A compound represented by formula (Ia) according to an aspect of the present invention is a novel compound included in the compounds represented by formula (I) according to an aspect of the present invention. Thus, a compound represented by formula (Ia) according to an aspect of the present invention may have a high mPTP-opening inhibitory activity and/or a useful therapeutic effect on diseases, symptoms or disorders caused by opening of mPTP.

In formula (Ia), $R^2$, $R^3$, $R^4$ and $R^5$ satisfy either one of the following conditions (i) and (ii).

(i)
$R^2$ represents a hydrogen or a substituted or unsubstituted $C_1$ to $C_5$ alkyl,
$R^3$ and $R^4$ together form a —O—C(=O)—, wherein a carbon atom to which $R^3$ is attached is bound to an O, and a carbon atom to which $R^4$ is attached is bound to a C(=O), and
$R^5$ represents a hydrogen,
(ii)
$R^2$ represents a hydrogen or a substituted or unsubstituted $C_1$ to $C_5$ alkyl, and
$R^3$, $R^4$ and $R^5$ each represent a hydrogen.

$R^2$, $R^3$, $R^4$ and $R^5$ preferably satisfy the conditions (i). If $R^2$, $R^3$, $R^4$ and $R^5$ represent groups as mentioned above, a compound represented by formula (Ia) according to an aspect of the present invention may have a high mPTP-opening inhibitory activity and/or a useful therapeutic effect on diseases, symptoms or disorders caused by opening of mPTP.

In an embodiment where $R^2$, $R^3$, $R^4$ and $R^5$ of formula (Ia) satisfy the condition (i) or (ii), $R^2$ represents preferably a hydrogen or an unsubstituted $C_1$ to $C_5$ alkyl; more preferably a hydrogen, a methyl, an ethyl, a n-propyl, an isopropyl, a n-butyl, a sec-butyl, an isobutyl, a tert-butyl or a n-pentyl; further preferably a hydrogen or a methyl; and particularly preferably, a methyl. If $R^2$ represents a group as mentioned above, a compound represented by formula (Ia) according to an aspect of the present invention may have a high mPTP-opening inhibitory activity and/or a useful therapeutic effect on diseases, symptoms or disorders caused by opening of mPTP.

In formula (Ia), $R^6$ represents a hydrogen or a hydroxyl. $R^6$ preferably represents a hydrogen. If $R^6$ represents a group as mentioned above, a compound represented by formula (Ia) according to an aspect of the present invention may have a high mPTP-opening inhibitory activity and/or a useful therapeutic effect on diseases, symptoms or disorders caused by opening of mPTP.

In formula (Ia), $R^7$, $R^8$, $R^9$ and $R^{10}$ satisfy either one of the following conditions (xi) and (xii):
(xi)
$R^7$ and $R^8$ together form an oxo (=O), and
$R^9$ and $R^{10}$ together form an oxo (=O),
(xii)
$R^7$ and $R^9$ each represent a hydroxyl,
$R^8$, together with a carbon atom attached thereto and an adjacent carbon atom, forms an ethene-1,2-diyl (>C=C<), and
$R^{10}$, together with a carbon atom attached thereto and an adjacent carbon atom, forms an ethene-1,2-diyl (>C=C<),
a bond represented by a solid line and a dotted line is a single bond or a double bond.

$R^7$, $R^8$, $R^9$ and $R^{10}$ preferably satisfy the conditions (xi). If $R^7$, $R^8$, $R^9$ and $R^{10}$ represent groups as mentioned above, a compound represented by formula (Ia) according to an aspect of the present invention may have a high mPTP-opening inhibitory activity and/or a useful therapeutic effect on diseases, symptoms or disorders caused by opening of mPTP.

In formula (Ia), $R^{11}$ represents a —C(=O)—NH$_2$ or a —CN. $R^{11}$ preferably represents a —C(=O)—NH$_2$. If $R^{11}$ represents a group as mentioned above, a compound represented by formula (Ia) according to an aspect of the present invention may have a high mPTP-opening inhibitory activity and/or a useful therapeutic effect on diseases, symptoms or disorders caused by opening of mPTP.

In formula (Ia), if $R^2$, $R^3$, $R^4$ and $R^5$ satisfy the conditions (i), $R^6$ represents a hydrogen and $R^{11}$ represents a —C(=O)—NH$_2$, $R^{1a}$ represents a halogen; whereas, if $R^2$, $R^3$, $R^4$ and $R^5$ satisfy the conditions (i), $R^6$ represents a hydrogen and $R^{11}$ represents a —CN, $R^{1a}$ represents a hydrogen or a halogen. It is preferable that $R^{1a}$ represents a halogen, $R^2$ represents a hydrogen or a substituted or unsubstituted $C_1$ to $C_5$ alkyl, $R^3$ and $R^4$ together form a —O—C(=O)—, wherein a carbon atom to which $R^3$ is attached is bound to an O, and a carbon atom to which $R^4$ is attached is bound to a C(=O), $R^5$ represents a hydrogen and $R^{11}$ represents a —C(=O)—NH$_2$. if $R^{1a}$, $R^2$, $R^3$, $R^4$, $R^5$, $R^6$ and $R^{11}$ represent groups as mentioned above, a compound represented by formula (Ia) according to an aspect of the present invention may have a high mPTP-opening inhibitory activity and/or a useful therapeutic effect on diseases, symptoms or disorders caused by opening of mPTP.

A compound represented by formula (Ia) according to an aspect of the present invention may include a compound defined by any one of the combinations of $R^{1a}$, $R^2$, $R^3$, $R^4$, $R^5$, $R^6$, $R^7$, $R^8$, $R^9$, $R^{10}$ and $R^{11}$.

In a compound represented by formula (Ia), preferably, $R^2$, $R^3$, $R^4$ and $R^5$ satisfy the following conditions (i) and (ii)

(i)
  $R^2$ represents a hydrogen or a substituted or unsubstituted $C_1$ to $C_5$ alkyl,
  $R^3$ and $R^4$ together form a —O—C(=O)—, wherein a carbon atom to which $R^3$ is attached is bound to an O, and a carbon atom to which $R^4$ is attached is bound to a C(=O), and
  $R^5$ represents a hydrogen,
(ii)
  $R^2$ represents a hydrogen or a substituted or unsubstituted $C_1$ to $C_5$ alkyl, and
  $R^3$, $R^4$ and $R^5$ each represent a hydrogen,
$R^6$ represents a hydrogen or a hydroxyl, and
$R^7$, $R^8$, $R^9$ and $R^{10}$ satisfy either one of the following conditions (xi) and (xii):
(xi)
  $R^7$ and $R^8$ together form an oxo (=O), and
  $R^9$ and $R^{10}$ together form an oxo (=O),
(xii)
  $R^7$ and $R^9$ each represent a hydroxyl,
  $R^8$, together with a carbon atom attached thereto and an adjacent carbon atom, forms an ethene-1,2-diyl (>C=C<), and
  $R^{10}$, together with a carbon atom attached thereto and an adjacent carbon atom, forms an ethene-1,2-diyl (>C=C<),
a bond represented by a solid line and a dotted line is a single bond or a double bond,
$R^{11}$ represents a C(=O)—NH$_2$ or a —CN,
if $R^2$, $R^3$, $R^4$ and $R^5$ satisfy the conditions (i), $R^6$ represents a hydrogen and $R^{11}$ represents a C(=O)—NH$_2$, $R^{1a}$ represents a halogen,
if $R^2$, $R^3$, $R^4$ and $R^5$ satisfy the conditions (i), $R^6$ represents a hydrogen and $R^{11}$ represents a —CN, $R^{1a}$ represents a hydrogen or a halogen, and
if the groups mentioned above are substituted, unless otherwise specified, the substituents each independently represent at least one monovalent group or divalent group selected from the group consisting of a halogen (fluorine, chlorine, bromine or iodine), a cyano, a nitro, a hydroxyl, a substituted or unsubstituted $C_1$ to $C_5$ alkyl, a substituted or unsubstituted $C_2$ to $C_5$ alkenyl, a substituted or unsubstituted $C_2$ to $C_5$ alkynyl, a substituted or unsubstituted $C_3$ to $C_6$ cycloalkyl, a substituted or unsubstituted $C_3$ to $C_6$ cycloalkenyl, a substituted or unsubstituted $C_3$ to $C_6$ cycloalkynyl, a substituted or unsubstituted 3- to 6-membered heterocycloalkyl, a substituted or unsubstituted $C_7$ to $C_{11}$ cycloalkylalkyl, a substituted or unsubstituted 3- to 6-membered heterocycloalkyl-$C_1$ to $C_5$ alkyl, a substituted or unsubstituted $C_6$ to $C_{15}$ aryl, a substituted or unsubstituted $C_7$ to $C_{20}$ arylalkyl, a substituted or unsubstituted 5- to 15-membered heteroaryl, a substituted or unsubstituted 5- to 15-membered heteroaryl-$C_1$ to $C_5$ alkyl, a substituted or unsubstituted $C_1$ to $C_6$ alkoxy, a substituted or unsubstituted $C_3$ to $C_6$ cycloalkoxy, a substituted or unsubstituted 3 to 6 heterocycloalkoxy, a substituted or unsubstituted $C_6$ to $C_{15}$ aryloxy, a substituted or unsubstituted $C_7$ to $C_{20}$ arylalkyloxy, a substituted or unsubstituted 5- to 15-membered heteroaryloxy, a substituted or unsubstituted 5- to 15-membered heteroaryl-$C_1$ to $C_5$ alkyloxy, a substituted or unsubstituted $C_1$ to $C_6$ alkoxycarbonyl, a substituted or unsubstituted $C_3$ to $C_6$ cycloalkoxycarbonyl, a substituted or unsubstituted aminocarbonyl (carbamoyl), a substituted or unsubstituted $C_1$ to $C_{20}$ acyl, a substituted or unsubstituted $C_1$ to $C_{20}$ acyloxy, a substituted or unsubstituted amino, a substituted or unsubstituted sulfonamide, a substituted or unsubstituted carbonyl diimino, a carboxyl and an oxo. The monovalent group or divalent group is usually unsubstituted. If the monovalent group or divalent group is substituted, the substituent is preferably further selected from the monovalent groups or divalent groups and more preferably further selected from the unsubstituted monovalent groups or divalent groups.

In a compound represented by formula (Ia), more preferably,
$R^2$, $R^3$, $R^4$ and $R^5$ satisfy the following conditions (i) and (ii)

(i)
  $R^2$ represents a hydrogen or a substituted or unsubstituted $C_1$ to $C_5$ alkyl,
  $R^3$ and $R^4$ together form a —O—C(=O)—, wherein a carbon atom to which $R^3$ is attached is bound to an O, and a carbon atom to which $R^4$ is attached is bound to a C(=O), and
  $R^5$ represents a hydrogen,
(ii)
  $R^2$ represents a hydrogen or a substituted or unsubstituted $C_1$ to $C_5$ alkyl, and
  $R^3$, $R^4$ and $R^5$ each represent hydrogen,
$R^6$ represents hydrogen, and
$R^7$, $R^8$, $R^9$ and $R^{10}$ satisfy either one of the following conditions (xi) and (xii):
(xi)
  $R^7$ and $R^8$ together form an oxo (=O), and
  $R^9$ and $R^{10}$ together form an oxo (=O),
(xii)
  $R^7$ and $R^9$ each represent a hydroxyl,
  $R^8$, together with a carbon atom attached thereto and an adjacent carbon atom, forms an ethene-1,2-diyl (>C=C<), and
  $R^{10}$, together with a carbon atom attached thereto and an adjacent carbon atom, forms an ethene-1,2-diyl (>C=C<),
a bond represented by a solid line and a dotted line is a single bond or a double bond, and
$R^{11}$ represents a C(=O)—NH$_2$ or a —CN,
if $R^2$, $R^3$, $R^4$ and $R^5$ satisfy the conditions (i), $R^6$ represents a hydrogen and $R^{11}$ represents a hydrogen, $R^{1a}$ represents a halogen,
if $R^2$, $R^3$, $R^4$ and $R^5$ satisfy the conditions (i), $R^6$ represents a hydrogen and $R^{11}$ represents a —CN, $R^{1a}$ represents a hydrogen or a halogen, and
if the groups mentioned above are substituted, unless otherwise specified, the substituents each independently represent at least one monovalent group or divalent group selected from the group consisting of a halogen (fluorine, chlorine, bromine or iodine), a cyano, a nitro, a hydroxyl, a substituted or unsubstituted $C_1$ to $C_5$ alkyl, a substituted or unsubstituted $C_2$ to $C_5$ alkenyl, a substituted or unsubstituted $C_2$ to $C_5$ alkynyl, a substituted or unsubstituted $C_3$ to $C_6$ cycloalkyl, a substituted or unsubstituted $C_3$ to $C_6$ cycloalkenyl, a substituted or unsubstituted $C_3$ to $C_6$ cycloalkynyl, a substituted or unsubstituted 3- to 6-membered heterocycloalkyl, a substituted or unsubstituted $C_7$ to $C_{11}$ cycloalkylalkyl, a substituted or unsubstituted 3- to 6-membered heterocycloalkyl-$C_1$ to $C_5$ alkyl, a substituted or unsubstituted $C_6$ to $C_{15}$ aryl, a substituted or unsubstituted $C_7$ to $C_{20}$ arylalkyl, a substituted or unsubstituted 5- to 15-membered heteroaryl, a substituted or unsubstituted 5- to 15-membered heteroaryl-$C_1$ to $C_5$ alkyl, a substituted or unsubstituted $C_1$ to $C_6$ alkoxy, a substituted or unsubstituted $C_3$ to $C_6$ cycloalkoxy, a substituted or unsubstituted 3 to 6 heterocycloalkoxy, a substituted or unsubstituted $C_6$ to $C_{15}$ aryloxy, a substituted or unsubstituted $C_7$ to $C_{20}$ arylalkyloxy, a substituted or unsubstituted 5- to 15-membered heteroaryloxy, a substituted or unsubstituted 5- to 15-membered heteroaryl-$C_1$ to $C_5$ alkyloxy, a substituted or unsubstituted $C_1$ to $C_6$ alkoxycarbonyl, a substituted or unsubstituted $C_3$ to $C_6$ cycloalkoxycarbonyl, a substituted or unsubstituted aminocarbonyl (carbamoyl), a substituted or unsubstituted $C_1$ to $C_{20}$ acyl, a substituted or unsubstituted $C_1$ to $C_{20}$ acyloxy, a substituted or unsubstituted amino, a substituted or unsubstituted sulfonamide, a substituted or unsubstituted carbonyl diimino, a carboxyl and an oxo. The monovalent group or divalent group is usually unsubstituted. If the monovalent group or divalent group is substituted, the substituent is preferably further selected from the monovalent groups or divalent groups and more preferably further selected from the unsubstituted monovalent groups or divalent groups.

In a compound represented by formula (Ia), further preferably,
$R^2$, $R^3$, $R^4$ and $R^5$ satisfy the following conditions (i) and (ii)
(i)
$R^2$ represents a hydrogen, a methyl, an ethyl, a n-propyl, an isopropyl, a n-butyl, a sec-butyl, an isobutyl, a tert-butyl or a n-pentyl,
$R^3$ and $R^4$ together form a —O—C(=O)—, wherein a carbon atom to which $R^3$ is attached is bound to an O, and a carbon atom to which $R^4$ is attached is bound to a C(=O), and
$R^5$ represents a hydrogen,
(ii)
$R^2$ represents a hydrogen, a methyl, an ethyl, a n-propyl, an isopropyl, a n-butyl, a sec-butyl, an isobutyl, a tert-butyl or a n-pentyl, and
$R^3$, $R^4$ and $R^5$ each represent a hydrogen,
$R^6$ represents a hydrogen, and
$R^7$, $R^8$, $R^9$ and $R^{10}$ satisfy either one of the following conditions (xi) and (xii):
(xi)
$R^7$ and $R^8$ together form an oxo (=O), and
$R^9$ and $R^{10}$ together form an oxo (=O),
(xii)
$R^7$ and $R^9$ each represent a hydroxyl,
$R^8$, together with a carbon atom attached thereto and an adjacent carbon atom, forms an ethene-1,2-diyl (>C=C<), and
$R^{10}$, together with a carbon atom attached thereto and an adjacent carbon atom, forms an ethene-1,2-diyl (>C=C<),
a solid line and a dotted line represent a single bond and a double bond, respectively,
$R^{11}$ represents a C(=O)—NH$_2$ or a —CN,
If $R^2$, $R^3$, $R^4$ and $R^5$ satisfy the conditions (i), $R^6$ represents a hydrogen and $R^{11}$ represents a —C(=O)—NH$_2$, $R^{1a}$ represents a halogen, and
If $R^2$, $R^3$, $R^4$ and $R^5$ satisfy the conditions (i), $R^6$ represents a hydrogen and $R^{11}$ represents a —CN, $R^{1a}$ represents a hydrogen or a halogen.

In a compound represented by formula (Ia), particularly preferably,
$R^1$ represents a hydrogen,
$R^2$, $R^3$, $R^4$ and $R^5$ satisfy the following conditions (i) and (ii)
(i)
$R^2$ represents a hydrogen or a methyl,
$R^3$ and $R^4$ together form a —O—C(=O)—, wherein a carbon atom to which $R^3$ is attached is bound to an O, and a carbon atom to which $R^4$ is attached is bound to a C(=O), and
$R^5$ represents a hydrogen,
(ii)
$R^2$ represents a hydrogen or a methyl, and
$R^3$, $R^4$ and $R^5$ each represent a hydrogen,
$R^6$ represents a hydrogen, and
$R^7$, $R^8$, $R^9$ and $R^{10}$ satisfy either one of the following conditions (xi) and (xii):
(xi)
$R^7$ and $R^8$ together form an oxo (=O), and
$R^9$ and $R^{10}$ together form an oxo (=O),
(xii)
$R^7$ and $R^9$ each represent a hydroxyl,
$R^8$, together with a carbon atom attached thereto and an adjacent carbon atom, forms an ethene-1,2-diyl (>C=C<), and
$R^{10}$, together with a carbon atom attached thereto and an adjacent carbon atom, forms an ethene-1,2-diyl (>C=C<),
a bond represented by a solid line and a dotted line is a single bond or a double bond,
$R^{11}$ represents a C(=O)—NH$_2$ or a —CN,
If $R^2$, $R^3$, $R^4$ and $R^5$ satisfy the conditions (i), $R^6$ represents a hydrogen and $R^{11}$ represents a —C(=O)—NH$_2$, $R^{1a}$ represents a halogen, and
If $R^2$, $R^3$, $R^4$ and $R^5$ satisfy the condition (i), $R^6$ represents a hydrogen and $R^{11}$ represent a —CN, $R^{1a}$ represents a hydrogen or a halogen.

Most particularly preferably, a compound represented by formula (Ia), a stereoisomer thereof, a prodrug thereof, or a pharmaceutically acceptable salt thereof, or a pharmaceutically acceptable solvate thereof is selected from the group consisting of
4-(((1S,4R,10S)-9-chloro-6-hydroxy-1-methyl-3,5-dioxo-1,3,4,5-tetrahydro-1,4-methanobenzo[c]oxepin-10-yl)methyl)-2,5-dihydro-3,6-dioxohexa-1,4-dienecarboxamide (compound Ia-1);
4-(((1S,4R,10S)-9-chloro-6-hydroxy-1-methyl-3,5-dioxo-1,3,4,5-tetrahydro-1,4-methanobenzo[c]oxepin-10-yl)methyl)-2,3,5,6-tetrahydroxybenzamide (compound Ia-2);
2,5-dihydroxy-4-(((1S,2S)-5-hydroxy-1-methyl-4-oxo-1,2,3,4-tetrahydronaphthalen-2-yl)methyl)-3,6-dioxocyclohexa-1,4-dienecarboxamide (compound Ia-3); and
2,5-dihydroxy-4-(((1S,4R,10S)-6-hydroxy-1-methyl-3,5-dioxo-1,3,4,5-tetrahydro-1,4-methanobenzo[c]oxepin-10-yl)methyl)-3,6-dioxocyclohexa-1,4-dienocarboxamide (compound Ia-4).

A compound represented by formula (Ia) according to an aspect of the present invention having the characteristics mentioned above may have a high mPTP-opening inhibitory activity and/or a useful therapeutic effect on diseases, symptoms or disorders caused by opening of mPTP.

In each of the aspects of the present invention, compounds represented by formulae (I) and (Ia) include not only the compounds themselves but also prodrugs of the compounds. In the specification, "prodrug" refers to a compound that is converted to a parent drug in vivo. Examples of the form of a prodrug of each of the compounds represented by formulae (I) and (Ia) according to aspects of the present invention include, but are not limited to, an ester formed of one or more hydroxyl group, particularly all hydroxyl groups and any carboxylic acid, and an amide formed of the hydroxyl group(s) and any amine. The form of a prodrug of each of the compounds represented by formulae (I) and (Ia) according to aspects of the present invention is preferably an ester formed of one or more, particularly all hydroxyl groups and at least one carboxylic acid selected from the group consisting of acetic acid, pivalic acid, benzoic acid and butyric acid; more preferably an ester of one or more, particularly all hydroxyl groups and acetic acid, pivalic acid or benzoic acid, and further preferably an ester of one or more, particularly all hydroxyl groups and acetic acid. If each of the compounds represented by formulae (I) and (Ia) according to aspects of the present invention is the form of a prodrug as mentioned above, when the prodrug is administered to a subject pharmacokinetics of the parent drug can be improved without substantially reducing the mPTP-opening inhibitory activity and pharmacological activity of each of parent drugs, i.e., compounds represented by formulae (I) and (Ia).

In each of the aspects of the present invention, compounds represented by formulae (I) and (Ia) and compounds represented by formulae (X) and (Xa) that will be described below include not only the compounds themselves but also salts of the compounds or prodrugs thereof. Examples of the salt of each of the compounds represented by formulae (I) and (Ia) and formulae (X) and (Xa) or prodrugs thereof include, but are not limited to, a salt of a compound and a cation such as sodium ion, potassium ion, calcium ion, magnesium ion, or a substituted or unsubstituted ammonium ion; or a salt of a compound and an inorganic acid such as hydrochloric acid, hydrogen bromide, sulfuric acid, nitric acid, carbonic acid or phosphoric acid; or a salt of a compound and an organic-acid anion such as formic acid, acetic acid, maleic acid, fumaric acid, benzoic acid, ascorbic acid, lactic acid, succinic acid, bismethylene salicylic acid, methanesulfonic acid, ethane disulfonic acid, propionic acid, tartaric acid, malic acid, salicylic acid, citric acid, gluconic acid, aspartic acid, stearic acid, palmitic acid, itaconic acid, glycolic acid, p-amino benzoic acid, glutamic acid, benzene sulfonic acid, cyclohexylsulfamic acid, methanesulfonic acid, ethane sulfonic acid, isethionic acid, p-toluene sulfonic acid or naphthalene sulfonic acid. If the compounds represented by formulae (I) and (Ia) or prodrugs thereof are in the form of salt as mentioned above, they can be used without substantially reducing mPTP-opening inhibitory activity.

In each of the aspects of the present invention, compounds represented by formulae (I) and (Ia) and compounds represented by formulae (X) and (Xa) described later include not only the compounds themselves and solvates of the compounds or prodrugs thereof, or salts thereof. Examples of solvents that can form solvates of the compounds represented by formulae (I) and (Ia) and formulae (X) and (Xa), or prodrugs thereof, or salts thereof include, but are not limited to, water, or an organic solvent such as a lower alcohol such as an alcohol having 1 to 6 carbon atoms (for example, methanol, ethanol or 2-propanol (isopropyl alcohol)), a higher alcohol such as an alcohol having 7 or more carbon atoms (for example, 1-heptanol or 1-octanol), dimethyl sulfoxide (DMSO), acetic acid, ethanolamine or ethyl acetate. If compounds represented by formulae (I) and (Ia), or prodrugs thereof, or salts thereof and a solvent as mentioned above form solvates, they can be used without substantially reducing mPTP-opening inhibitory activity.

In each of the aspects of the present invention, compounds represented by formulae (I) and (Ia) and compounds represented by formulae (X) and (Xa) described later include not only the compounds themselves but also protected forms thereof. In the specification, "protected form" refers to the form obtained by introducing a protecting group into one or a plurality of functional groups (for example, hydroxyl group or amino group). In the specification, a protected form of the compound as mentioned above will be sometimes described as a protected derivative. In the specification, the "protecting group" refers to a group that is to be introduced into a predetermined functional group in order to prevent proceeding of an undesirable reaction and to be quantitatively removed in predetermined reaction conditions; in other words, refers to a substantially stable and inactive group in reaction conditions except the predetermined reaction conditions. Examples of the protecting groups that can form the protected compound as mentioned above include, but are not limited to, silyl (for example, t-butyldimethylsilyl (TBS), triisopropylsilyl (TIPS) or tert-butyldiphenylsilyl (TBDPS)) or alkoxy (for example, methoxymethoxy (MOM) or methoxy (Me)) for a hydroxyl group; and t-butoxycarbonyl (Boc), 2-bromobenzyloxycarbonyl (BrZ), or 9-fluorenylmethoxycarbonyl (Fmoc) for an amino group. Protection by the protecting group and removal of the protecting group can be appropriately carried out by those skilled in the art in accordance with reaction conditions commonly used. If compounds represented by formulae (I) and (Ia) are protected by the protecting groups as mentioned above, the compounds can be used without substantially reducing mPTP-opening inhibitory activity.

In each of the aspects of the present invention, if each of the compounds represented by formulae (I) and (Ia) and compounds represented by formulae (X) and (Xa) described later has a single or a plurality of tautomers, the compound of the invention includes individual such tautomers.

In each of the aspects of the present invention, if each of the compounds represented by formulae (I) and (Ia) and compounds represented by formulae (X) and (Xa) described later has a single or a plurality of stereocenters (chiral centers), the compound of the invention includes stereoisomers of the compound including individual enantiomers and diastereomers, and a mixture of them such as a racemate.

Compounds represented by formulae (I) and (Ia) having the aforementioned characteristics may have a high mPTP-opening inhibitory activity and/or a useful therapeutic effect on diseases, symptoms or disorders caused by opening of mPTP.

<2. Method for Producing Compound>

Another aspect of the present invention relates to a method for producing each of the compounds represented by formulae (I) and (Ia) according to aspects of the present invention.

The production method according to the aspect can be carried out, unless otherwise specified, based on any one of the methods for synthesizing a compound as long as it is commonly known. In individual steps of the production method according to the aspect that will be described below, if necessary, protecting a functional group and removing a protecting group from the functional group can be carried out by a protection and deprotection method commonly known in the technical field.

In the production method according to the aspect, each of the compounds represented by formulae (I) and (Ia) according to aspects of the present invention can be produced by production method 1 or 2 or a similar method thereto.

In the production method according to the aspect, the compound obtained in each of the steps described below can be subjected directly to the following reaction step just in the state after completion of a reaction, that is, a reaction mixture, or a crude product. Alternatively, the compound obtained in each of the steps may be isolated or purified from a reaction mixture in accordance with an isolation or purification means for an organic compound commonly used in the technical field, and then used in the reaction of the following step, or can be obtained as a final product. In this case, examples of the isolation or purification means for a compound that can be used include, but are not limited to, concentration, extraction, filtration, centrifugation, adsorption, recrystallization, distillation and various chromatographic methods.

In the production method of the aspect, if the compound obtained in each of the steps described below is a mixture of stereoisomers, the compound can be directly used as it is in the following reaction step. The compound in the form of a mixture of stereoisomers can be optically resolved by a means commonly used such as chiral column chromatography, optical fragmentation or derivatization to a diastereomer to obtain a substantially optically pure state, and then used in the following reaction step or obtained as a final product.

[2-1. Production Method 1]

In an embodiment of the aspect, the method for producing a compound represented by formula (I) according to an aspect of the present invention can be carried out by a method (hereinafter referred to also as "production method 1") comprising a step of oxidizing a compound represented by formula (X):

[Formula 6]

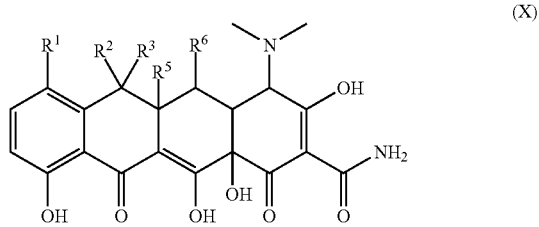

in DMSO in the presence of air (hereinafter referred to also as "oxidation step").

The method for producing a compound represented by formula (Ia) according to the aspect of the present invention can be carried out by a method (hereinafter referred to also as "production method 1") comprising a step of oxidizing a compound represented by formula (Xa):

[Formula 7]

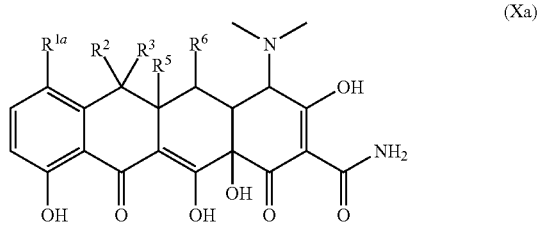

in DMSO in the presence of air (hereinafter referred to also as "oxidation step"). Compounds represented by formulae (I) and (Ia) according to aspects of the present invention can be produced by production method 1 according to the embodiment.

In formulae (X) and (Xa), $R^1$, $R^{1a}$, $R^2$, $R^3$, $R^5$ and $R^6$ are the same as defined above.

Compounds represented by formulae (X) and (Xa) include tetracycline or an analog thereof. The compounds represented by formulae (X) and (Xa) may be prepared by purchasing the compounds prepared in advance, or prepared with reference to a literature known in the art.

In the oxidation step, the reaction temperature falls within the range of preferably 0 to 80° C. and more preferably 20 to 40° C. The reaction time, although it is not particularly limited, falls within the range of usually one hour to 14 days and particularly 3 to 7 days.

In production method 1, after the oxidation step, a step (hereinafter referred to also as the "hydrogenation step") of hydrogenating the product obtained in the oxidation step in the presence of hydrogen may be further carried out. If the hydrogenation step is carried out, it is possible to obtain a compound represented by formula (I) or (Ia) wherein $R^2$, $R^3$, $R^4$ and $R^5$ satisfy conditions (ii) from a compound represented by formula (I) or (Ia) wherein $R^2$, $R^3$, $R^4$ and $R^5$ satisfy conditions (i).

The hydrogenation step is usually carried out in the presence of a catalyst such as Pd/C, Pd(OH)$_2$, Raney nickel or platinum oxide. The catalyst is preferably Pd/C.

In the hydrogenation step, the partial pressure of hydrogen falls within the range of preferably 0.1 to 1 MPa and more preferably 0.1 to 0.35 MPa.

In the hydrogenation step, the reaction temperature falls within the range of preferably 0 to 60° C. and more preferably 20 to 30° C. The reaction time, although it is not particularly limited, falls within the range of usually one hour to 5 days and particularly, one hour to one day.

In production method 1, after the oxidation step or optionally after the hydrogenation step, a step (hereinafter referred to also as the "nitrile formation step") of forming a nitrile by dehydrating carboxylic amide of the product obtained in the oxidation step or optionally in the hydrogenation step may be further carried out. If the nitrile formation step is carried out, it is possible to obtain a compound represented by formula (I) or (Ia), wherein $R^{11}$ represents a —CN, from a compound represented by formula (I) or (Ia) wherein $R^{11}$ represents a —C(=O)—NH$_2$ The nitrile formation step is usually carried out in the presence of a nitrile forming reagent such as PdCl$_2$, trifluoroacetic anhydride, acetic anhydride, phosphorus oxychloride or thionyl chloride. The nitrile forming reagent is preferably PdCl$_2$.

In the nitrile formation step, the reaction temperature falls within the range of preferably 20 to 70° C. and more preferably 20 to 50° C. The reaction time, although it is not particularly limited, falls within the range of usually one hour to 5 days and particularly, one hour to one day.

[2-2. Production Method 2]

In an embodiment of this aspect, the method for producing a compound represented by formula (I) or (Ia) according to an aspect of the present invention can be carried out by a method (hereinafter referred to also as "production method 2") comprising a step of reacting a compound represented by formula (X) or (Xa) in the presence of, e.g., mercury acetate, meta-chloroperbenzoic acid or peroxidase (Genus *Paecilomyces*).

Production method 2 can be carried out with reference to a literature such as Journal of Organometallic Chemistry (1967), 32(4), 1241-1243 (mercury acetate, see, Reference Examples 1 and 4), U.S. Pat. No. 3,438,999 (meta-chloroperbenzoic acid or peroxidase, see Reference Examples 2 and 4), Journal of Antibiotics (2010), 63 (12), 693-698 (see, Reference Example 3) or Journal of Organic Chemistry (2016), 81, 6186-6194 (Genus *Paecilomyces*).

If production method 1 or 2 according to the aspect is carried out, compounds represented by formulae (I) and (Ia) according to aspects of the present invention can be produced.

<3. Pharmaceutical Use>

Compounds represented by formulae (I) and (Ia) according to aspects of the present invention have a high mPTP-opening inhibitory activity. Thus, another aspect of the present invention relates to a mPTP-opening inhibitor comprising a compound represented by formula (I) or (Ia) according to an aspect of the present invention, a stereoisomer thereof, a prodrug thereof, or a pharmaceutically acceptable salt thereof, or a pharmaceutically acceptable solvate thereof, as an active ingredient. If a compound represented by formula (I) or (Ia) according to an aspect of the present invention is administered to a subject, certain diseases, symptoms and disorders of the subject can be prevented or treated through mPTP-opening inhibitory activity. Thus, another aspect of the present invention relates to a medicament comprising a compound represented by formula (I) according to an aspect of the present invention, a stereoisomer thereof, a prodrug thereof, or a pharmaceutically acceptable salt thereof, or a pharmaceutically acceptable solvate thereof, as an active ingredient for use in prevention or treatment of diseases, symptoms or disorders caused by opening of mPTP. Another aspect of the present invention relates to a medicament comprising a compound represented by formula (Ia) according to an aspect of the present invention, a stereoisomer thereof, a prodrug thereof, or a pharmaceutically acceptable salt thereof, or a pharmaceutically acceptable solvate thereof, as an active ingredient.

In each of the aspects of the present invention, each of the compounds represented by formulae (I) and (Ia) has an inhibitory activity specific to preferably opening of mPTP, more preferably opening of mPTP of a subject to which the compound is to be administered, further preferably opening of mPTP of a human or non-human mammal (for example, a warm-blooded animal such as pig, dog, cow, rat, mouse, guinea pig, rabbit, chicken, sheep, cat, monkey, hamadryas baboon or chimpanzee); and particularly preferably opening of mPTP of a human. If the compound represented by formula (I) or (Ia) or a medicament comprising the compound as an active ingredient is administered to a subject as mentioned above, certain diseases, symptoms and disorders of the subject can be prevented or treated.

In each of the aspects of the present invention, the mPTP-opening inhibitory activity of a compound represented by formula (I) or (Ia) used as an active ingredient, although it is not limited, can be determined by evaluating the inhibitory effect of the compound against mPTP in mitochondria isolated from a brain of a model, i.e., a subject to which the compound is to be administered, in accordance with the following procedure. Based on the method described in the literature (reference literature: Sims N R, J Neurochem, vol. 55, p. 698-707, 1990, Rapid isolation of metabolically active mitochondria from rat brain and subregions using Percoll density gradient centrifugation), mitochondria are prepared from a model of a subject (for example, mouse). To the pellet of mitochondria isolated, a measurement buffer (for example, 210 mM sucrose, 20 mM potassium chloride, 3 mM glycylglycine, 1 mM potassium dihydrogen phosphate) containing a fluorescent calcium indicator, i.e., calcium green-5N, is added so as to obtain a predetermined concentration to prepare a mitochondrial suspension. Calcium green binds to calcium to emit fluorescence and serves as a quantitative probe. When calcium green is added to the mitochondrial suspension, the presence of calcium in an external fluid thereof can be detected. Mitochondria are suspended with the measurement buffer containing calcium green and added in wells of a 96-well plate. In predetermined wells, a measurement buffer containing a test compound in a predetermined concentration is added to prepare a mitochondrial suspension. In mitochondrial suspension put in the wells of a 96-well plate, calcium is continuously added dropwise and a value of fluorescence, which reflects the amount of calcium present outside mitochondria, is measured (for example, fluorescence wavelength: 488 nm, excitation wavelength: 527 nm). Measurement can be carried out by a functional drug screening device (for example, FDSS3000, Hamamatsu Photonics K. K.). Calcium (for example, $CaCl_2$)) is added to the mitochondrial suspension at predetermined intervals (for example, every minute). It is observed that the fluorescent signal value increases with addition of calcium and decreases immediately after uptake of calcium by mitochondria. Thereafter, when addition of $CaCl_2$) is repeated, a rapid increase of the signal due to opening of mPTP is observed. The (requisite) amount of calcium accumulated in mitochondria and released by opening of mPTP is CRC of mitochondria. The case where the same test is carried out using a measurement buffer containing DMSO in the same concentration as a test compound is regarded as a control (not containing a compound). The amount (CRC) of calcium required for inducing mPTP-opening in the presence of a test compound, and the amount (CRC(DMSO)) of calcium required for inducing mPTP-opening in the absence of the compound (control) are obtained, and then the ratio of CRC/CRC(DMSO) is obtained and used as an evaluation criterion for mPTP-opening inhibitory activity of the test compound.

In each of the aspects of the present invention, a compound represented by formula (I) or (Ia) used as an active ingredient has the CRC/CRC(DMSO) value representing the mPTP-opening inhibitory activity that is determined in accordance with the aforementioned procedure. The value is usually 1.00 or more, typically within the range of 1.51 or more and 2.0 or less, particularly within the range of 2.1 or more and 2.5 or less, and especially within the range of 2.51 or more and 3.0 or less. If a compound represented by formula (I) or (Ia) used as an active ingredient has a CRC/CRC(DMSO) value within the above range, the compound can particularly effectively prevent or treat certain diseases, symptoms and disorders of a subject.

When each of the compounds represented by formulae (I) and (Ia) according to aspects of the present invention is applied to pharmaceutical use, the compound includes not only the compound itself but also a stereoisomer, a prodrug thereof, or a pharmaceutically acceptable salt thereof, or a pharmaceutically acceptable solvate thereof. Examples of a pharmaceutically acceptable salt of each of the compounds represented by formulae (I) and (Ia) according to aspects of the present invention, a stereoisomer thereof or a prodrug thereof and a pharmaceutically acceptable solvate thereof include, but are not limited to, salts and solvates as mentioned above. If each of the compounds represented by formulae (I) and (Ia) according to aspects of the present invention, a stereoisomer thereof or a prodrug thereof is a salt or solvate thereof, the compound can be applied to a desired pharmaceutical use without substantially reducing mPTP-opening inhibitory activity and pharmacological activity.

If each of the compounds represented by formulae (I) and (Ia) according to aspects of the present invention is applied to pharmaceutical use, the compound may be used alone or in combination with one or more pharmaceutically acceptable components. The medicament according to the aspect can be formulated into various dosage forms usually used in the technical field depending the desired administration method. Thus, a medicament according to the aspect can be provided as a pharmaceutical composition comprising a compound represented by formula (I) or (Ia) according to an aspect of the present invention, a stereoisomer thereof, a prodrug thereof, or a pharmaceutically acceptable salt thereof, or a pharmaceutically acceptable solvate thereof and at least one pharmaceutically acceptable carrier. A pharmaceutical composition according to the aspect may contain not only the components mentioned above but also e.g., at least one pharmaceutically acceptable medium (for example, a solvent such as sterilized water or a solution such as saline), an excipient, a binder, a vehicle, a dissolution aid, a preservative, a stabilizer, a swelling agent, a lubricant, a surfactant, an emulsifier, an oily liquid (for example, vegetable oil), a suspension, a buffer, a soothing agent, an antioxidant, a sweetener and a flavoring agent.

The dosage form of a medicament according to the aspect, which contains a compound represented by formula (I) or (Ia) according to an aspect of the present invention, a stereoisomer thereof, a prodrug thereof, or a pharmaceutically acceptable salt thereof, or a pharmaceutically acceptable solvate thereof as active ingredient, although it is not particularly limited, may be a formulation to be parenterally or orally administered. The dosage form of a formulation of a medicament according to the aspect may be a single unit-dose form or a multiple unit-dose form. Examples of the formulation for parenteral administration include an injection such as an aseptic solution or suspension consisting of water or another pharmaceutically acceptable medium, a lotion, an ointment, an eye drop and a suppository. Examples of a component to be added to an injection, include, but are not limited to, a vehicle such as tonicity agent containing saline, glucose or another auxiliary agent (for example, D-sorbitol, D-mannitol, D-mannose or sodium chloride); a dissolution aid such as an alcohol (for example, ethanol or benzyl alcohol), a polyalcohol (for example, propylene glycol or polyethylene glycol) or an ester (for example, benzyl benzoate); a nonionic surfactant such as polysorbate 80 (trademark) or polyoxyethylene hydrogenated castor oil; an oily liquid such as sesame oil or soybean oil; a buffer such as a phosphate buffer or a sodium acetate buffer; a soothing agent such as benzalkonium chloride or procaine hydrochloride; a stabilizer such as human serum albumin or polyethylene glycol; a preservative; and an antioxidant. The injection prepared is usually put in appropriate vials (for example, ampoules) and stored in an appropriate environment until use.

Examples of the formulation for oral administration include tablets, pills, powders, granules, powders, capsules, microcapsules, elixirs, liquids, syrups, slurry agents and suspensions. Tablets may be sugar-coated tablets, gelatin-coated tablets, enteric tablets or film-coated tablets which are prepared by coating them with sugar or a soluble film, or double-layer or multi-layer tablets.

Examples of components to be added in tablets or capsules include, but are not limited to, a binder such as water, ethanol, propanol, simple syrup, glucose solution, carboxymethyl cellulose, shellac, methyl cellulose, potassium phosphate, polyvinylpyrrolidone, gelatin, cornstarch, tragacanth gum or gum Arabic; an excipient such as crystalline cellulose, lactose, white sugar, sodium chloride, glucose, urea, starch, calcium carbonate, kaolin or silicic acid; a disintegrant such as dry starch, sodium alginate, agar powder, laminarin powder, sodium hydrogen carbonate, calcium carbonate, polyoxyethylene sorbitan fatty acid ester, sodium lauryl sulfate, stearic acid monoglyceride, starch or lactose; a disintegration inhibitor such as white sugar, stearin cocoa butter or hydrogenated oil; an absorption enhancer such as a quaternary ammonium salt or sodium lauryl sulfate; a moisturizer such as glycerin or starch; an adsorbent such as starch, lactose, kaolin, bentonite or colloidal silicic acid; a lubricant such as purified talc, stearate (for example, magnesium stearate), borax powder or polyethylene glycol; a sweetener such as sucrose, lactose or saccharin; and a flavoring agent such as peppermint, *Gaultheria* adenothrix oil or cherry. If the formulation is encapsulated, further liquid carrier such as a fat and oil may be contained.

A medicament according to the aspect can be prepared as a depot formulation. In this case, a medicament according to the aspect to be used as a depot formulation can be embedded under, e.g., the skin or muscle, or administered by intramuscular injection. If the medicament according to the aspect is applied to a depot formulation, pharmacological activity of the compounds represented by formulae (I) and (Ia) according to aspects of the present invention can be continuously expressed for a long term.

A medicament according to an aspect comprising a compound represented by formula (I) or (Ia) according to an aspect of the present invention, a stereoisomer thereof, a prodrug thereof, or a pharmaceutically acceptable salt thereof, or a pharmaceutically acceptable solvate thereof, as an active ingredient can be used in combination with one or more additional drugs useful as a medicament. In the medicament according to the aspect, the additional drug to be used in combination with a compound represented by formula (I) or (Ia) according to an aspect of the present invention may be any drug as long as it does not inhibit the effect of the compound represented by formula (I) or (Ia) according to an aspect of the present invention. In the medicament according to the aspect, examples of the additional drug to be used in combination with a compound represented by formula (I) or (Ia) according to an aspect of the present invention include, but are not limited to, mitochondrial function improving agent, a neurodegenerative disease therapeutic agent, a muscle disease therapeutic agent, a heart disease therapeutic agent, a kidney disease therapeutic agent and an ischemia-reperfusion injury therapeutic agent. The additional drug is preferably a drug known to have mPTP-opening inhibitory effect, including idebenone, olesoxime (TRO19622), rasagiline, simvastatin, aliskiren (directly renin inhibitor), amlodipine, atorvastatin, carvedilol, cilostazol, coenzyme Q10, latrepirdine, doxycycline, edaravone, EGb 761, exenatide (glucagon-like peptide 1 receptor agonist), metformin, minocycline, nicorandil (KATP channel opening agent), nitroglycerin, ranolazine, rosuvastatin, tauroursodeoxycholic acid (TUDCA), tacrolimus, cyclosporine A, ropinirole, pramipexole and selegiline. In the medicament according to the aspect, examples of the additional drug to be used in combination with a compound represented by formula (I) or (Ia) according to an aspect of the present invention include, but are not limited to, therapeutic agents for mood disorders such as bipolar disorder and depression. The additional drug is preferably a drug known to have a mPTP-opening inhibitory effect, including trifluoroperazine, promethazine, triflupromazine, clomipramine, fluphenazine, chlorprotixen, nortriptyline, promazine, thioridazine, desipramine, chlorpromazine, prochlorperazine, pimethixene, perphenazine, amitriptyline, amoxapine, maprotiline, periciazine, mianserin, imipramine, clozapine, fluoxetine and lithium. In this case, the embodiment of the medicament according to the aspect is a combination drug comprising: a compound represented by formula (I) or (Ia) according to an aspect of the present invention, a stereoisomer thereof, a prodrug thereof, or a pharmaceutically acceptable salt thereof, or a pharmaceutically acceptable solvate thereof; and one or more additional drugs as mentioned above. The embodiment of the combination drug may be in the form of a pharmaceutical composition comprising a compound represented by formula (I) or (Ia) according to an aspect of the present invention, a stereoisomer thereof, a prodrug thereof, or a pharmaceutically acceptable salt thereof, or a pharmaceutically acceptable solvate thereof, and one or more additional drugs as mentioned above in combinations, or may be in the form of a pharmaceutical composition comprising a compound represented by formula (I) or (Ia) according to an aspect of the present invention, a stereoisomer thereof, a prodrug thereof, or a pharmaceutically acceptable salt thereof, or a pharmaceutically acceptable solvate thereof, which is used in combination with one or more additional drugs. If the medicament according to the aspect is in the form of a combination drug as mentioned above, the medicament may be provided in the form of a single formulation comprising: a compound represented by formula (I) or (Ia) according to an aspect of the present invention, a stereoisomer thereof, a prodrug thereof, or a pharmaceutically acceptable salt thereof, or a pharmaceutically acceptable solvate thereof; and one or more additional drugs, or may be provided in the form of a pharmaceutical combination or a kit comprising multiple formulations produced by formulating the compound a stereoisomer thereof, a prodrug thereof, or a pharmaceutically acceptable salt thereof, or a pharmaceutically acceptable solvate thereof, and one or more additional drugs, separately. In the form of the pharmaceutical combination or kit, the formulations can be simultaneously or separately (for example, sequentially) administered.

A medicament according to the aspect comprising a compound represented by formula (I) or (Ia) according to an aspect of the present invention, a stereoisomer thereof, a prodrug thereof, or a pharmaceutically acceptable salt thereof, or a pharmaceutically acceptable solvate thereof. As an active ingredient can prevent or treat various diseases, symptoms and/or disorders caused by opening of mPTP, in the same way. Examples of the diseases, symptoms and/or disorders include, but are not limited to, ischemia-reperfusion injury in percutaneous coronary angioplasty, abnormal engraftment or removal of a transplanted organ, a neurodegenerative disease and a mood disorder. Examples of the neurodegenerative diseases include, but are not limited to, amyotrophic lateral sclerosis, Alzheimer's disease, Huntington's disease, Parkinson's disease, and multiple sclerosis. Examples of the mood disorder include, but are not limited to, bipolar disorder and depression. The disease, symptom and/or disorder are preferably one or more diseases, symptoms or disorders selected from the group consisting of ischemia-reperfusion injury in percutaneous coronary angioplasty, abnormal engraftment or removal of a transplanted organ, a neurodegenerative disease and a mood disorder. The disease, symptom or disorder caused by opening of mPTP can be prevented or treated by administering a medicament according to the aspect to a subject in need of the prevention or treatment of the disease, symptoms or disorder.

When the medicament according to the aspect is used for preventing abnormal engraftment or removal of a transplanted organ, it is preferable that the medicament according to the aspect is applied before transplantation. If the medicament according to the aspect is used in this manner and the organ to be transplanted is stored in good conditions, it is possible to prevent abnormal engraftment or removal of a transplanted organ.

The medicament according to the aspect comprising a compound represented by formula (I) or (Ia) according to an aspect of the present invention, a stereoisomer thereof, a prodrug thereof, or a pharmaceutically acceptable salt thereof, or a pharmaceutically acceptable solvate thereof, as an active ingredient can be applied to various subjects in need of prevention or treatment of the symptom, disease and/or disorder caused by opening of mPTP. The subject is preferably a human patient or non-human mammal test subject (for example, a warm-blooded animal such as pig, dog, cow, rat, mouse, guinea pig, rabbit, chicken, sheep, cat, monkey, hamadryas baboon or chimpanzee). If the medicament according to the aspect is administered to a subject as mentioned above, the disease, symptom and/or disorder of the subject caused by opening of mPTP can be prevented or treated.

In the specification, "prevention" refers to substantially preventing occurrence (onset or expression) of a symptom, disease and/or disorder. In the specification, "treatment" refers to suppressing (for example, suppressing progression), mitigating, retrieving and/or healing a symptom, disease and/or disorder that occurred (are developed or expressed).

Compounds represented by formulae (I) and (Ia) according to aspects of the present invention can be used for prevention or treatment of symptoms, diseases and/or disorders as mentioned above in subjects having the symptoms, diseases and/or disorders (for example, ischemia-reperfusion injury in percutaneous coronary angioplasty, abnormal engraftment or removal of a transplanted organ, a neurodegenerative disease and a mood disorder). Thus, a medicament according to the aspect is a medicament for use in preventing or treating preferably the symptoms, diseases and/or disorders as mentioned above; and more preferably at least one symptom, disease and/or disorder selected from the group consisting of ischemia-reperfusion injury in percutaneous coronary angioplasty, abnormal engraftment or removal of a transplanted organ, a neurodegenerative disease and a mood disorder. If the medicament according to the aspect is used for preventing or treating the symptoms, diseases and/or disorders caused by opening of mPTP, it is possible to prevent or treat the symptoms, diseases and/or disorders caused by opening of mPTP inhibitory activity.

Compounds represented by formulae (I) and (Ia) according to aspects of the present invention can be used for preventing or treating the symptoms, diseases and/or disorders mentioned above of subjects having the symptoms, diseases and/or disorder (for example, ischemia-reperfusion injury in percutaneous coronary angioplasty, abnormal engraftment or removal of a transplanted organ, a neurodegenerative disease and a mood disorder). Thus, another aspect of the present invention relates to a method for preventing or treating the symptoms, diseases and/or disorders, comprising administering an effective amount of a compound represented by formula (I) or (Ia) according to an aspect of the present invention, a stereoisomer thereof, a prodrug thereof, or a pharmaceutically acceptable salt thereof, or a pharmaceutically acceptable solvate thereof, to a subject in need of prevention or treatment of the symptoms, diseases and/or disorders. The symptom, disease and/or disorder is preferably one or more symptoms, diseases or disorders selected from the group consisting of ischemia-reperfusion injury in percutaneous coronary angioplasty, abnormal engraftment or removal of a transplanted organ, a neurodegenerative disease and a mood disorder. If a compound represented by formula (I) or (Ia) according to an aspect of the present invention is administered to a subject in need of prevention or treatment of symptoms, diseases and/or disorders mentioned above, it is possible to prevent or treat the symptoms, diseases and/or disorders through mPTP-opening inhibitory activity.

Another aspect of the present invention relates to a compound represented by formula (I) or (Ia) according to an aspect of the present invention, a stereoisomer thereof, a prodrug thereof, or a pharmaceutically acceptable salt thereof, or a pharmaceutically acceptable solvate thereof, for use in prevention or treatment of symptoms, diseases and/or disorders (for example, ischemia-reperfusion injury in percutaneous coronary angioplasty, abnormal engraftment or removal of a transplanted organ, a neurodegenerative disease and a mood disorder) mentioned above. Another aspect of the present invention relates to use of a compound represented by formula (I) or (Ia) according to an aspect of the present invention, a stereoisomer thereof, a prodrug thereof, or a pharmaceutically acceptable salt thereof, or a pharmaceutically acceptable solvate thereof in the manufacture of a medicament for preventing or treating the symptoms, diseases and/or disorders (for example, ischemia-reperfusion injury in percutaneous coronary angioplasty, abnormal engraftment or removal of a transplanted organ, a neurodegenerative disease and a mood disorder). The symptom, disease and/or disorder are preferably one or more diseases, symptoms or disorders selected from the group consisting of ischemia-reperfusion injury in percutaneous coronary angioplasty, abnormal engraftment or removal of a transplanted organ, a neurodegenerative disease and a mood disorder. If a compound represented by formula (I) or (Ia) according to an aspect of the present invention or a medicament of the aspect is used for prevention or treatment of the symptoms, diseases and/or disorders, the symptoms as mentioned above, it is possible to prevent or treat the diseases and/or disorders through mPTP-opening inhibitory activity.

When a medicament comprising a compound represented by formula (I) or (Ia) according to an aspect of the present invention, a stereoisomer thereof, a prodrug thereof, or a pharmaceutically acceptable salt thereof, or a pharmaceutically acceptable solvate thereof, as an active ingredient, is administered to a subject, particularly, a human patient, an accurate dose and schedule (for example, dosage amount, frequency and/or administration route) should be finally determined by a doctor in charge in view of various factors such as the age, sex of the subject, the precise state (for example, severity) of symptom, disease and/or disorder to be prevented or treated and administration route and in consideration of the therapeutically effective dose, frequency, and administration route. Thus, a compound represented by formula (I) or (Ia) serving as an active ingredient in a medicament according to the aspect is administered to a subject in a therapeutically effective amount and a frequency. When a medicament according to the aspect is administered to a human patient, the dosage amount of a compound represented by formula (I) or (Ia) as an active ingredient falls within the range of usually 0.001 to 100 mg/kg body weight, typically 0.01 to 10 mg/kg body weight, and particularly 0.1 to 10 mg/kg body weight per dose. The frequency of administration of a medicament according to the aspect is, for example, one or a plurality of times (for example, 2 or 3 times) per day or once several days. The administration route of a medicament according to the aspect is not particularly limited and the medicament may be administered orally or parenterally (for example, in the rectum, diameter mucosa, intestines, intramuscular, subcutaneous, in the bone marrow, in the sheath, directly in the ventricular, intravenous, intravitreal, intraperitoneal, in the nasal cavity or eye). The drug may be administered alone or a plurality of times. If a medicament according to the aspect is used in accordance with the dose and schedule as mentioned above, it is possible to prevent or treat the symptoms, diseases and/or disorders as mentioned above through mPTP-opening inhibitory activity.

EXAMPLES

Now, the present invention will be more specifically described by way of Examples. However, the technical scope of the present invention is not limited by these Examples. It is obvious that various applications, modifications and corrections of the examples can be made within the range of the present invention. Methods for producing intermediates and starting materials used in Examples will be described as Reference Examples. Reference Examples are also examples for specifically describing the embodiments of the present invention and should not be construed as limiting the present invention. It is obvious that various applications, modifications and corrections of the Reference Examples can be made within the range of the present invention.

Unless otherwise specified, stereochemical arrangements of all compounds disclosed in Examples of the specification will be defined by chemical names even if the structures drawn herein represent specific arrangements.

Individual aspects of the present invention relate to all stereoisomers of a compound described and defined in the specification. More specifically, aspects of the present invention include not only compounds described in Examples as defined by their chemical names but also all stereoisomers derived from the structure drawn herein.

Abbreviations used in Examples and Reference Examples stand for the followings.

M: mol/L $^1$H-NMR: Proton nuclear magnetic resonance spectrum (270 MHz or 500 MHz)

ESI MS: Electrospray ionization mass spectrometry

DMSO: Dimethyl sulfoxide

<I. Synthesis of Compound>

Reference Example 1

Preparation of 2,5-dihydroxy-4-(((1S,4R,10S)-6-hydroxy-1-methyl-3,5-dioxo-1,3,4,5-tetrahydro-1,4-methanobenzo[c]oxepin-10-yl)methyl)-3,6-dioxocyclohexa-1,4-dienocarboxamide (compound I-1) and 2,3,5,6-tetrahydroxy-4-(((1S,4R,10S)-6-hydroxy-1-methyl-3,5-dioxo-1,3,4,5-tetrahydro-1,4-methanobenzo[c]oxepin-10-yl)methyl)benzamide (Compound I-2) (Hg(OAc)$_2$ Method)

[Formula 8]

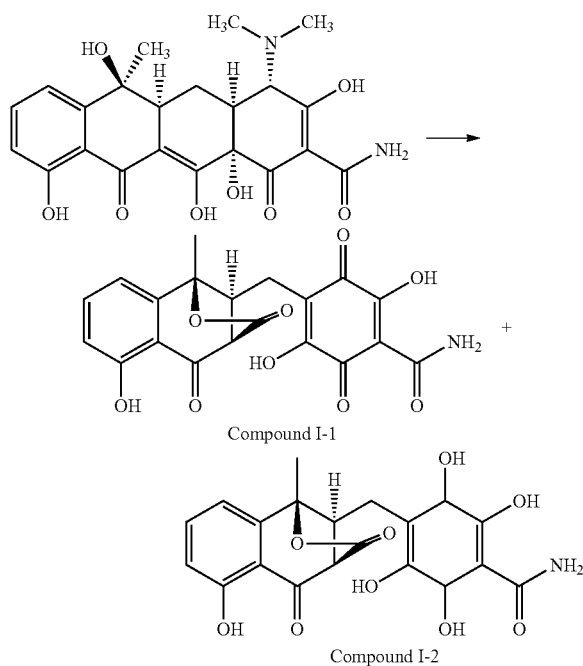

To a solution containing tetracycline (1 g) in glacial acetic acid (8 mL), a solution containing mercury acetate (1.51 g) in glacial acetic acid (4 mL) was added. The reaction solution was stirred at 50° C. for two days. After filtration of a substance containing mercury that precipitated, the reaction solution was treated with excessive hydrogen sulfide, and mercury sulfide was removed by Celite filtration. The filtrate was lyophilized, and water (25 mL) was added to the residue obtained. The pH of the resultant solution was adjusted to be 1.3 (acidic) with diluted hydrochloric acid. After stirred for one hour, the solution was filtered to obtain a crude product as a red-brown amorphous solid substance (containing compounds I-1 and I-2) in a yield of 683 mg (73.4%).

The crude product (100 mg) was purified by preparative HPLC (0.1% TFA CH$_3$CN:H$_2$O=10:90 to 90:10) to obtain 2,3,5,6-tetrahydroxy-4-(((1S,4R,10S)-6-hydroxy-1-methyl-3,5-dioxo-1,3,4,5-tetrahydro-1,4-methanobenzo[c]oxepin-10-yl)methyl)benzamide (compound I-2)(10 mg, 10%) and 2,5-dihydroxy-4-(((1S,4R,10S)-6-hydroxy-1-methyl-3,5-dioxo-1,3,4,5-tetrahydro-1,4-methanobenzo[c]oxepin-10-yl)methyl)-3,6-dioxocyclohexa-1,4-dienocarboxamide (compound I-1)(30 mg, 30%).

Compound I-1:
ESI MS: 414.37 (M+H); $^1$H-NMR (500 MHz, DMSO) δ 11.36 (s, 1H), 9.47 (s, 1H), 9.16 (s, 1H), 7.66 (dd, J=8.3, 7.8 Hz, 1H), 7.21 (dd, J=7.8, 0.8 Hz, 1H), 7.09 (dd, J=8.3, 0.8 Hz, 1H), 3.51 (s, 1H), 3.17 (dd, J=11.5, 4.4 Hz, 1H), 2.72 (dd, J=13.2, 4.4 Hz, 1H), 2.52 (dd, J=13.2, 11.5 Hz, 1H), 1.90 (s, 3H).

Compound I-2:
ESI MS: 416.42 (M+H); $^1$H-NMR (500 MHz, DMSO) δ11.41 (s, 1H), 9.48 (s, 1H), 9.41 (s, 1H), 7.68 (dd, J=8.3, 7.8 Hz, 1H), 7.20 (dd, J=7.8, 0.8 Hz, 1H), 7.08 (dd, J=8.3, 0.8 Hz, 1H), 4.22 (d, J=5.0 Hz, 1H), 3.03 (d, J=4.0 Hz, 1H), 2.83 (dd, J=11.0, 4.0 Hz, 1H), 2.57 (d, J=11.0 Hz, 1H), 2.20 (s, 3H).

Reference Example 2

Preparation of 2,5-dihydroxy-4-(((1S,4R,10S)-6-hydroxy-1-methyl-3,5-dioxo-1,3,4,5-tetrahydro-1,4-methanobenzo[c]oxepin-10-yl)methyl)-3,6-dioxocyclohexa-1,4-dienocarboxamide (Compound I-1)

[Formula 9]

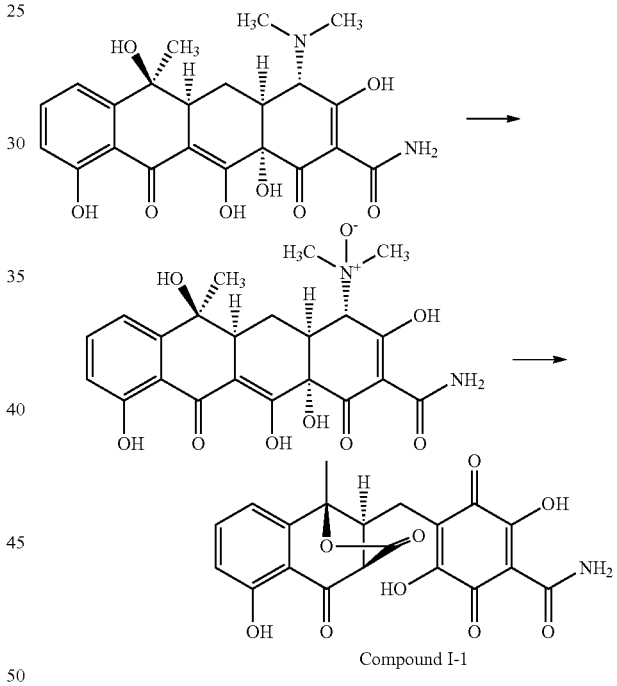

Tetracycline (500 mg) was suspended in chloroform (30 mL), and meta-chloroperbenzoic acid (388 mg) was added to the suspension with stirring while cooling in ice and supplying current of nitrogen gas. The suspension was stirred for 10 minutes. The mixture was further stirred at 30° C. for 2 days. The resultant mixture was concentrated under reduced pressure. To the mixture, 1 N hydrochloric acid (20 mL) was added. The solid substance that precipitated was obtained by filtration and washed with water. To the solid substance obtained, ethyl acetate (30 mL) was added, and insoluble matter was filtered. The filtrate was concentrated under reduced pressure up to about 2 mL. To the filtrate, methanol was added to allow a solid substance to precipitate. The precipitate was subjected to an ultrasonic treatment and then obtained by filtration. Washing was repeated in the same procedure, and the solid substance obtained was dried under reduced pressure to obtain the title compound as a yellow solid substance in a yield of 54 mg (12%).

Isolation of N-Oxide

[Formula 10]

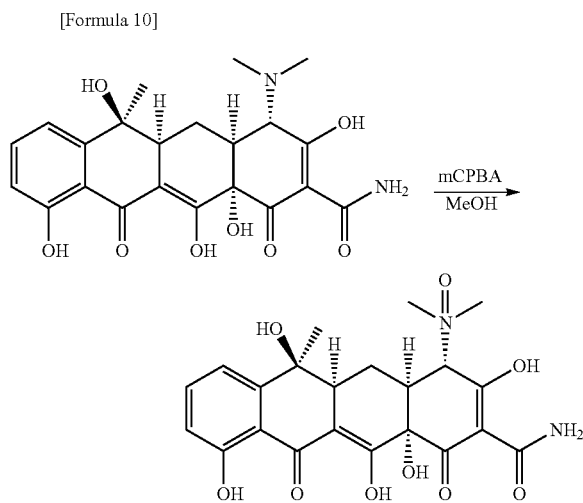

Tetracycline (1 g) was suspended in methanol (25 mL) and cooled in ice. To the suspension, meta-chloroperbenzoic acid (purity 65%, 896 mg) was added in a nitrogen atmosphere. The reaction solution was stirred for 5 minutes. The temperature of the reaction solution was returned to room temperature, and the solvent was concentrated up to about 10 mL by spraying nitrogen gas to the solution. The solid substance that precipitated was obtained by filtration. The solid substance was washed with methanol to obtain the title compound as a brown solid substance in a yield of 277 mg (27%).

ESI MS: 461.23 (M+H); $^1$H-NMR (500 MHz, CD$_3$OD) δ: 7.50 (dd, J=8.3, 7.8 Hz, 1H), 7.13 (dd, J=7.8, 0.8 Hz, 1H), 6.91 (dd, J=8.3, 0.8 Hz, 1H), 4.23 (s, 1H), 3.53 (s, 3H), 3.47 (s, 3H), 3.19 (d, J=12.2 Hz, 1H), 3.00 (q, J=5.6 Hz, 1H), 2.18-2.09 (m, 1H), 1.95-1.87 (m, 1H), 1.60 (s, 3H).

Reference Example 3

Preparation of (S)-4-((8-(dimethylamino)-5-hydroxy-4-oxo-1,2,3,4-tetrahydronaphthalen-2-yl)methyl)-2,5-dihydroxy-3,6-dioxocyclohexa-1,4-dienecarboxamide (Compound I-3)

[Formula 11]

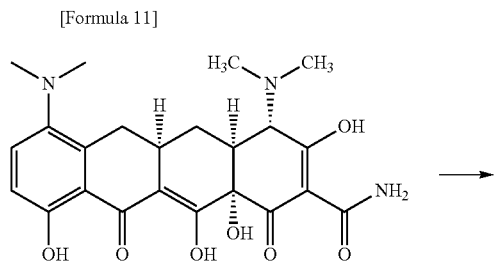

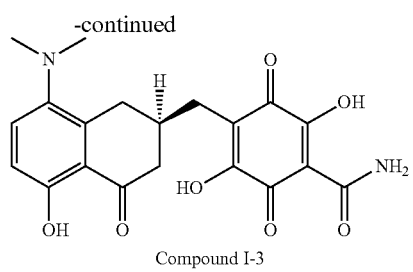

Compound I-3

To a solution of minocycline (500 mg) in THF (5 mL), a 1 N sodium hydroxide solution (0.94 mL) was added. The mixture was concentrated under reduced pressure, and subsequently toluene was added to the mixture. The mixture was concentrated by azeotropic distillation under reduced pressure. The residue and mercury acetate (711 mg) were dissolved in DMF (8 mL) and molecular sieve 4A was added to the DMF solution. The mixture was stirred at room temperature for one hour. The substance containing mercury that precipitated was subjected to Celite filtration. The residue on the filter was washed with ethyl acetate. The filtrate obtained was concentrated under reduced pressure and stirred in an EDTA-pH6.4 phosphate buffer at 35 to 40° C. overnight. The solid substance that precipitated was obtained by filtration and washed with water. The residue was dried under reduced pressure to obtain the title product in a yield of 89 mg (22%).

ESI MS: 401.43 (M+H); $^1$H-NMR (270 MHz, DMSO) δ 12.39 (s, 1H), 9.47 (s, 1H), 9.14 (s, 1H), 7.60 (d, J=9.18 Hz, 1H), 6.85 (d, J=9.18 Hz, 1H), 3.13-3.21 (m, 1H), 2.77 (s, 6H), 2.77-2.56 (m, 3H), 2.50-2.47 (m, 2H), 2.29 (m, 1H).

Reference Example 4

Preparation of 3-(((1S,4R,10S)-6-acetoxy-1-methyl-3,5-dioxo-1,3,4,5-tetrahydro-1,4-methanobenzo[c]oxepin-10-yl)methyl)-6-carbamoyl benzene-1,2,4,5-tetrayl tetraacetate (Compound I-4)

[Formula 12]

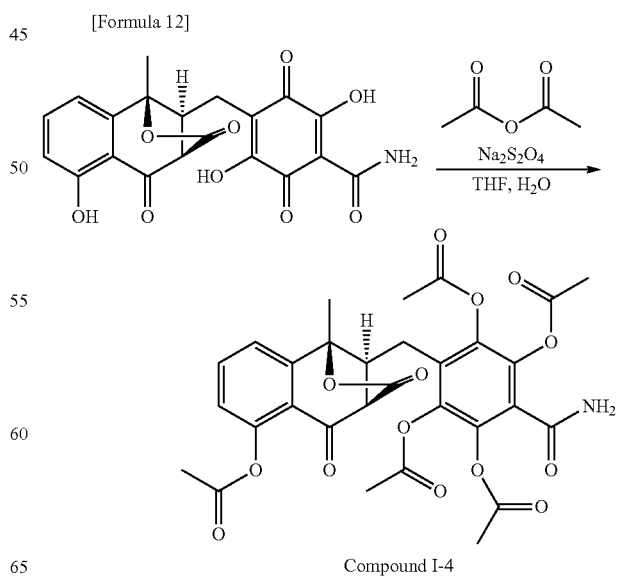

Compound I-4

To a mixture of compound I-1 (100 mg), anhydrous acetic acid (1.84 g) and sodium dithionite (800 mg), water (2 mL) was added. The reaction solution was stirred at room temperature for 3 hours. To the reaction solution, water was added. The resultant solution was subjected to extraction with ethyl acetate. The ethyl acetate layer was dried over anhydrous sodium sulfate and then concentrated under reduced pressure. To the residue, anhydrous acetic acid (1.84 g) was added, and the reaction solution was stirred at 50° C. for 8 hours. The reaction solution was concentrated under reduced pressure and the solid substance obtained was suspended/washed with water. The solid substance was further suspended/washed with methanol to obtain the title compound as a white solid substance in a yield of 21 mg (14%).

ESI MS: 626.37 (M+H); $^1$H-NMR (270 MHz, CDCl$_3$) δ 11.51 (s, 1H), 8.17 (s, 1H), 7.53 (t, J=8.1 Hz, 1H), 7.06 (d, J=8.1 Hz, 1H), 7.03 (d, J=7.1 Hz, 1H), 3.60 (s, 1H), 3.03-2.91 (m, 2H), 2.63 (t, J=13.7 Hz, 1H), 2.47 (s, 3H), 2.32 (s, 6H), 2.27 (s, 6H), 1.94 (s, 3H), 1.55 (s, 6H).

Synthesis Example 1

Preparation of 4-(((1S,4R,10S)-9-chloro-6-hydroxy-1-methyl-3,5-dioxo-1,3,4,5-tetrahydro-1,4-methanobenzo[c]oxepin-10-yl)methyl)-2,5-dihydro-3,6-dioxohexa-1,4-dienecarboxamide (compound Ia-1) and 4-(((1S,4R,10S)-9-chloro-6-hydroxy-1-methyl-3,5-dioxo-1,3,4,5-tetrahydro-1,4-methanobenzo[c]oxepin-10-yl)methyl)-2,3,5,6-tetrahydroxybenzamide (Compound Ia-2)

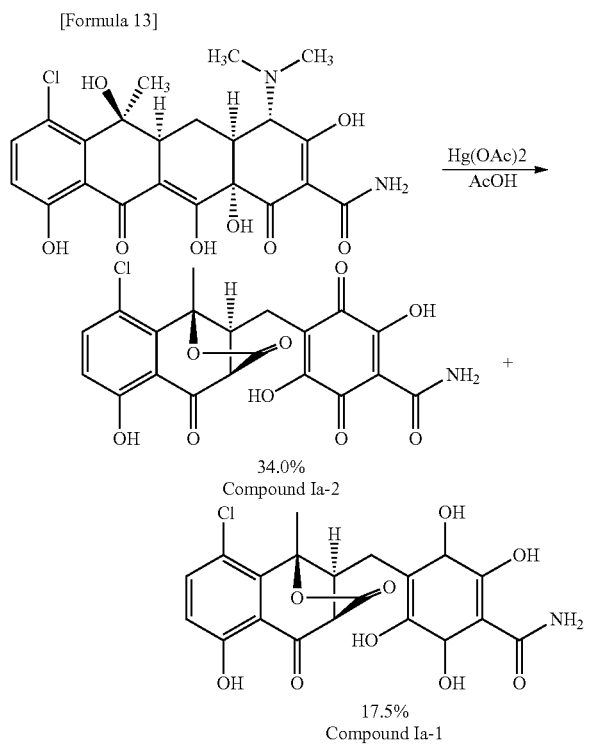

filtered, and the filtrate was concentrated under reduced pressure. The residue and mercury acetate (1.31 g) were dissolved in glacial acetic acid (8 mL). The mixture was stirred at room temperature overnight. After the substance containing mercury that precipitated was filtered, the residue on the filter was washed well with ethyl acetate. The filtrate obtained was treated with excessive hydrogen sulfide, and mercury sulfide was removed by Celite filtration. The filtrate was lyophilized and water (25 mL) was added to the obtained residue. The pH of the resultant solution was adjusted to be 1.3 (acidic) with diluted hydrochloric acid. After the mixture was stirred for one hour, red oil was separated by decantation. The oil obtained was dissolved in ethyl acetate, dried over sodium sulfate and subjected to filtration to obtain a crude product containing compounds Ia-1 and Ia-2 in a yield of 880 mg (quantitative).

The crude product (200 mg) was purified by preparative HPLC (0.1% TFA CH$_3$CN:H$_2$O=10:90 to 90:10) to obtain 4-(((1S,4R,10S)-9-chloro-6-hydroxy-1-methyl-3,5-dioxo-1,3,4,5-tetrahydro-1,4-methanobenzo[c]oxepin-10-yl)methyl)-2,5-dihydro-3,6-dioxohexa-1,4-dienecarboxamide (compound Ia-1)(35 mg, 17.5%) and 4-(((1S,4R,10S)-9-chloro-6-hydroxy-1-methyl-3,5-dioxo-1,3,4,5-tetrahydro-1,4-methanobenzo[c]oxepin-10-yl)methyl)-2,3,5,6-tetrahydroxybenzamide (compound Ia-2)(68 mg, 34%).

(Compound Ia-1)

ESI MS: 448.25 (M+H); $^1$H-NMR (500 MHz, DMSO) δ 12.11 (s, 1H), 9.48 (s, 1H), 9.17 (s, 1H), 7.67 (d, J=9.2 Hz, 1H), 7.13 (d, J=9.2 Hz, 1H), 3.53 (s, 1H), 3.32 (dd, J=11.5, 4.3 Hz, 1H), 2.76 (dd, J=13.0, 4.3 Hz, 1H), 2.47 (dd, J=13.0, 11.5 Hz, 1H), 2.22 (s, 3H).

(Compound Ia-2)

ESI MS: 450.26. (M+H); $^1$H-NMR (500 MHz, DMSO) δ 12.41 (s, 1H), 9.48 (s, 1H), 9.41 (s, 1H), 7.68 (d, J=9.0 Hz, 1H), 7.20 (d, J=9.0 Hz, 1H), 4.22 (d, J=5.0 Hz, 1H), 3.03 (d, J=4.0 Hz, 1H), 2.83 (d, J=14.5 Hz, 1H), 2.57 (d, J=11.0 Hz, 1H), 2.20 (s, 3H).

Synthesis Example 2

Preparation of 2,5-dihydroxy-4-(((1S,4R,10S)-6-hydroxy-1-methyl-3,5-dioxo-1,3,4,5-tetrahydro-1,4-methanobenzo[c]oxepin-10-yl)methyl)-3,6-dioxocyclohexa-1,4-dienocarboxamide (Compound I-1)

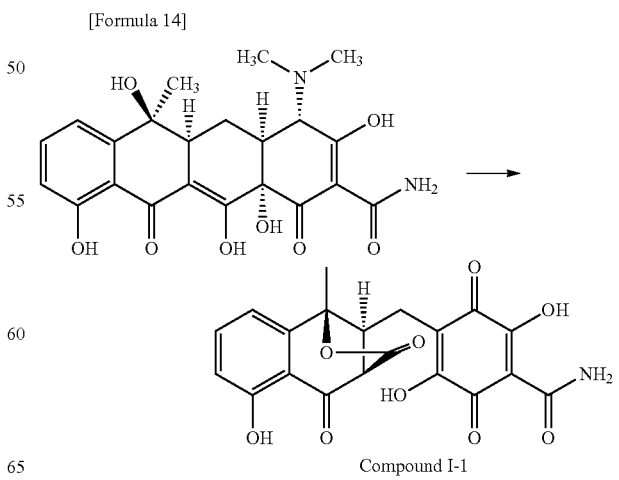

To a solution of chlortetracycline (1 g) in THF, a 1 N sodium hydroxide solution (2 mL) was added, and subsequently magnesium sulfate was added. The mixture was Tetracycline (10 g) was dissolved in dimethyl sulfoxide (50 mL) and stirred at 30° C. for 2 days while bubbling air. To the mixture, 1 N hydrochloric acid (200 mL) was added, and a solid substance that precipitated was obtained by filtration and washed with water. To the solid substance obtained, ethyl acetate (300 mL) was added. After the reaction solution was stirred, insoluble matter was filtered. The filtrate was concentrated under reduced pressure up to about 20 mL. To the filtrate, methanol was added to allow a solid substance to precipitate. The precipitate was subjected to an ultrasonic treatment and then obtained by filtration. The precipitate was further washed with acetone and dried under reduced pressure to obtain the title compound as a yellow solid substance in a yield of 2.5 g (26%).

$^1$H-NMR (500 MHz, DMSO) δ 11.36 (s, 1H), 9.47 (s, 1H), 9.16 (s, 1H), 7.66 (dd, J=8.3, 7.8 Hz, 1H), 7.21 (dd, J=7.8, 0.8 Hz, 1H), 7.09 (dd, J=8.3, 0.8 Hz, 1H), 3.51 (s, 1H), 3.17 (dd, J=11.5, 4.4 Hz, 1H), 2.72 (dd, J=13.2, 4.4 Hz, 1H), 2.52 (dd, J=13.2, 11.5 Hz, 1H), 1.90 (s, 3H).

$^{13}$C-NMR (500 MHz, DMSO) δ 194.54, 172.01, 170.46, 161.93, 144.29, 137.64, 119.56, 115.37, 115.17, 112.51, 98.00, 86.57, 61.94, 52.28, 21.33, 16.73.

Synthesis Example 3

Preparation of 2,5-dihydroxy-4-(((1S,2S)-5-hydroxy-1-methyl-4-oxo-1,2,3,4-tetrahydronaphthalen-2-yl)methyl)-3,6-dioxocyclohexa-1,4-dienecarboxamide (Compound Ia-3)

[Formula 15]

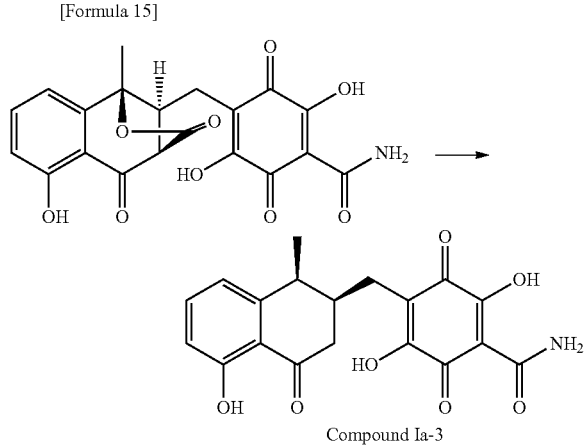

Compound Ia-3

A mixture of compound I-1 (50 mg), 5% Pd/C (5 mg) and tetrahydrofuran (10 mL) was stirred for one day in a hydrogen atmosphere (0.35 MPa). The reaction solution was filtered, and the filtrate was concentrated under reduced pressure. The solid substance obtained was suspended/washed with ethyl acetate:hexane=9:1, obtained by filtration and dried under reduced pressure to obtain the title compound as a yellow solid substance in a yield of 29 mg (64%).

ESI MS: 372.24 (M+H); $^1$H-NMR (500 MHz, DMSO) δ 12.46 (s, 1H), 9.46 (s, 1H), 9.14 (s, 1H), 7.47 (t, J=7.9 Hz, 1H), 6.83 (d, J=7.5 Hz, 1H), 6.76 (dd, J=8.3, 0.8 Hz, 1H), 3.08-2.99 (m, 1H), 2.73-2.63 (m, 1H), 2.49-2.34 (m, 4H), 1.22 (d, J=7.2 Hz, 3H).

Synthesis Example 4

Preparation of 2,5-dihydroxy-4-(((1S,4R,10S)-6-hydroxy-1-methyl-3,5-dioxo-1,3,4,5-tetrahydro-1,4-methanobenzo[c]oxepin-10-yl)methyl)-3,6-dioxocyclohexa-1,4-dienocarbonitrile (Compound Ia-4)

[Formula 16]

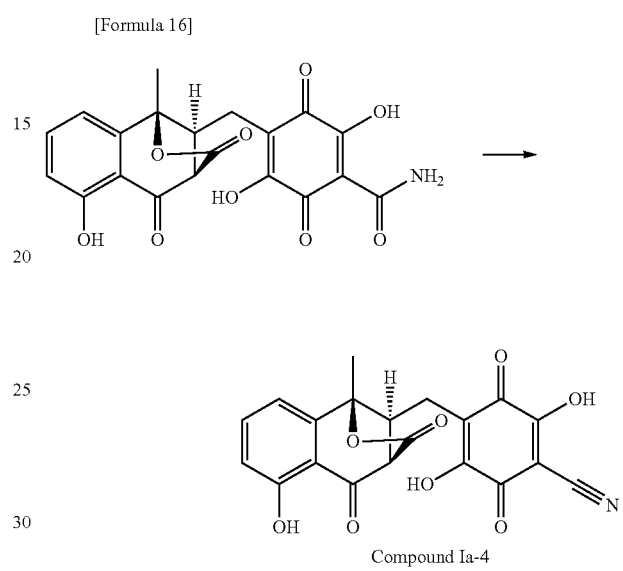

Compound Ia-4

A mixture of compound I-1 (50 mg), PdCl$_2$ (50 mg) and acetonitrile:water (1:1, 8 mL) was stirred at 50° C. for one day. The solvent was evaporated under reduced pressure, and the residue obtained was purified by DAIAION (0.1% TFA water-methanol) to obtain the title compound as a brown solid substance in a yield of 15 mg (31%).

Synthesis Example 5

Preparation of 3-carbamoyl-6-(((1S,4R,10S)-1-methyl-3,5-dioxo-6-(pivaloyloxy)-1,3,4,5-tetrahydro-1,4-methanobenzo[c]oxepin-10-yl)methyl)benzene-1,2,4,5-tetrayltetrakis(2,2-dimethylpropanoate) (Compound I-5)

[Formula 17]

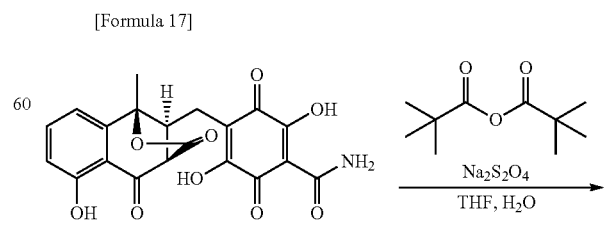

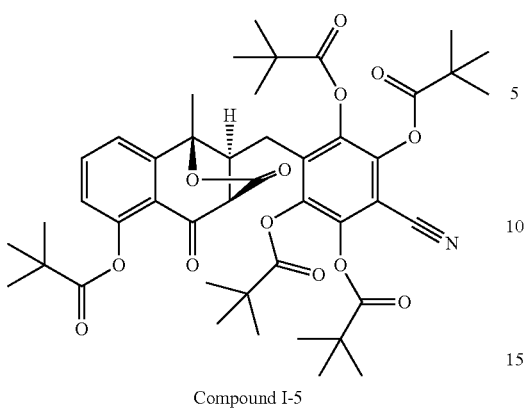

Compound I-5

To a mixture of compound I-1 (100 mg), pivalic acid anhydride (451 mg), sodium dithionite (632 mg) and tetrahydrofuran (4 mL), water (4 mL) was added. The reaction solution was stirred at room temperature for 6 hours and subjected to extraction with dichloromethane. The dichloromethane layer was dried over anhydrous sodium sulfate and then concentrated under reduced pressure. To the residue, tetrahydrofuran (4 mL) and pivalic acid anhydride (451 mg) were added. The reaction solution was stirred at 80° C. overnight. To the reaction solution, water was added. The resultant solution was subjected to extraction with ethyl acetate. The ethyl acetate layer was dried over anhydrous sodium sulfate and concentrated under reduced pressure. The residue was purified by silica gel column chromatography (hexane:ethyl acetate=4:1 to 1:1) and (dichloromethane:ethyl acetate=97:3 to 95:5) to obtain the title compound as a white solid substance in a yield of 33 mg (16%).

ESI MS: 818.81 (M+H); $^1$H-NMR (270 MHz, CDCl$_3$) δ 7.65 (t, J=8.0 Hz, 1H), 7.45 (dd, J=8.0, 0.8 Hz, 1H), 7.15 (dd, J=8.1, 0.8 Hz, 1H), 3.44 (s, 1H), 3.25 (dd, J=10.9, 4.5 Hz, 1H), 2.96 (dd, J=13.4, 4.5 Hz, 1H), 2.67-2.76 (m, 1H), 1.97 (s, 3H), 1.41 (s, 9H), 1.36-1.39 (m, 27H), 1.34 (s, 9H).

Synthesis Example 6

Preparation of 3-(((1S,4R,10S)-6-(benzoyloxy)-1-methyl-3,5-dioxo-1,3,4,5-tetrahydro-1,4-methano-benzo[c]oxepin-10-yl)methyl)-6-carbamoyl benzene-1,2,4,5-tetraryl tetrabenzoate) (Compound I-6)

[Formula 18]

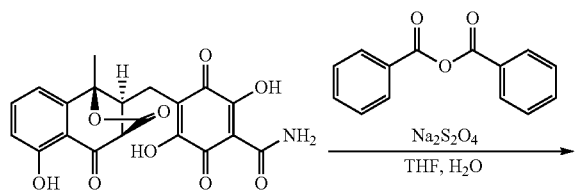

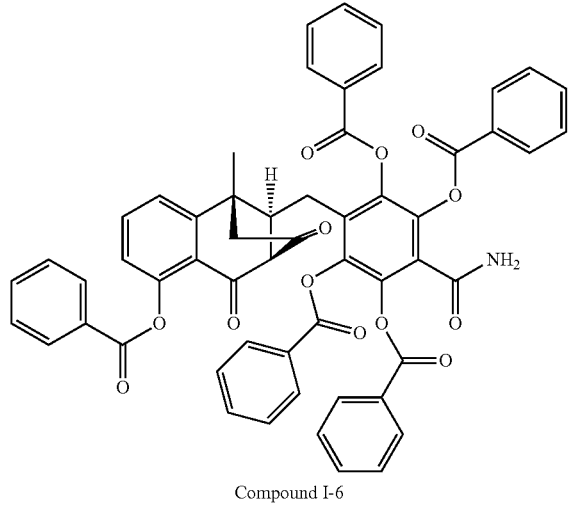

Compound I-6

To a mixture of compound I-1 (130 mg), benzoic anhydride (547 mg), sodium dithionite (800 mg) and tetrahydrofuran (4 mL), water (5 mL) was added. The reaction solution was stirred at room temperature for 40 minutes. The reaction solution was subjected to extraction with ethyl acetate. The ethyl acetate layer was dried over anhydrous sodium sulfate and concentrated under reduced pressure. To the residue, tetrahydrofuran (5 mL) and benzoic anhydride (54 7 mg) were added. The reaction solution was stirred at 80° C. for a day. To the reaction solution, water was added. The solution was subjected to extraction with dichloromethane. The dichloromethane layer was dried over anhydrous sodium sulfate and concentrated under reduced pressure. The residue was purified by silica gel column chromatography (hexane:ethyl acetate=7:3 to 3:7) to obtain the title compound as a white solid substance in a yield of 174 mg (63%).

ESI MS: (M+H); 936.67 $^1$H-NMR (270 MHz, CDCl$_3$) δ 11.60 (s, 1H), 9.22 (s, 1H), 8.03-7.93 (m, 4H), 7.90-7.83 (m, 4H), 7.79-7.73 (m, 2H), 7.59-7.28 (m, 12H), 7.25-7.16 (m, 4H), 7.04 (d, J=7.9 Hz, 1H), 6.83 (d, J=7.6 Hz, 1H), 3.81 (s, 1H), 3.25-3.10 (m, 2H), 2.84 (dd, J=14.2, 12.2 Hz, 1H), 1.69 (s, 3H).

<II. Pharmacological Test of Novel Compounds>
[II-1. mPTP-Opening Inhibitory Activity Test]

In this test, inhibitory effects of mPTP in mitochondria isolated from the brain were evaluated.

When the calcium level within the cytoplasm in cells constituting a tissue excessively increases in a living body, opening of mPTP is induced in mitochondria. As a result, inorganic ions, water and biomolecules present inside and outside the mitochondria enter into mitochondria to reduce a mitochondrial membrane potential and swell the mitochondria. At the same time, an apoptosis-inducing factor (hereinafter, referred to also as "AIF") and cytochrome c are released from mitochondria, activating a signaling cascade that leads to cell death. The reaction can be reproduced by separating mitochondria from a living tissue and increasing the calcium concentration of a mitochondrial suspension.

The mPTP-opening inhibitory activity and efficacy of test compounds are determined by evaluating inhibitory potency thereof against opening of mPTP formed of inner and outer mitochondrial membranes, by in-vitro assay described later.

(Preparation of Mitochondria from Mouse Brain)

Mitochondria were prepared from C57B6J-lineage male mice (8 to 40 weeks old) (reference literature: Sims N R, J Neurochem, vol. 55, p. 698-707, 1990, Rapid isolation of metabolically active mitochondria from rat brain and sub-regions using Percoll density gradient centrifugation). The animal was humanely euthanized by cervical dislocation, and the brain was excised out. The brain excised out was put in an isolation buffer (280 mM sucrose, 10 mM 3-morpholinopropanesulfonic acid (MOPS), 1 mM ethylenediamine tetraacetic acid dipotassium salt (EDTA-2K), pH 7.2) cooled in ice. The brain was rinsed with the buffer cooled in ice and cut by scissors in the buffer put in a beaker placed on ice. The cut pieces were transferred to a Dounce glass homogenizer. The buffer was exchanged with an isolation buffer containing 12% Percoll, and the cut pieces were homogenized. The cut pieces were homogenized four times by use of a loose pestle and 8 times by use of a tight pestle while vertically rotating. The homogenate was gently overlaid on the layer formed of two portions different in density of Percoll (26%, 40%) in 50 ml-centrifuge tubes, which were then spun by a centrifuge (HITACHI CR22N, rotor R20A2) maintained at 4° C. at 30700×g for 5 minutes. The intermediate layer between the 26% layer and the 40% layer was carefully sucked by use of a 23 G needle, added in an isolation buffer (24 ml) previously cooled in ice, and spun by a centrifuge at 16700×g to allow mitochondria to precipitate as a pellet. The supernatant was gently discarded and the mitochondria was suspended. The amount of the mitochondrial suspension was measured and an aliquot of 20 µl was taken for determining protein concentration. To the mitochondrial suspension, 10 mg/ml BSA (120 l) was added and further an isolation buffer was added up to a volume of 1.2 ml (final concentration 1 mg/mL). The suspension was transferred to 2.0 ml tubes and then centrifuged. The supernatant was discarded and mitochondrial pellets were obtained and stored in ice. The protein amount of mitochondria was measured in accordance with the Bradford method.

(Measurement of Calcium Retention Capacity (CRC))

To mitochondrial pellets isolated, a measurement buffer (210 mM sucrose, 20 mM potassium chloride, 3 mM glycylglycine and 1 mM potassium dihydrogen phosphate) containing a fluorescent calcium indicator, calcium green-5N (200 nM), was added to as to obtain a concentration of 150 µg/ml. In this manner, a mitochondrial suspension was prepared. Calcium green, which binds to calcium and emits fluorescence, is used as a probe for quantification. When calcium green is added to a mitochondrial suspension, the presence of calcium in the external fluid thereof can be detected. The mitochondrial suspension prepared by suspending mitochondria with the measurement buffer containing 400 nM calcium green was added in wells of a 96 well plate. To predetermined wells, a measurement buffer containing 40 mM glutamic acid, 4 mM malic acid and a double-concentration of test compound was added to prepare a mitochondrial suspension of 100 µl/well (final concentration: 20 mM glutamic acid, 2 mM malic acid). To the mitochondrial suspension in the wells of the 96 well plate, calcium was continuously added dropwise (10 µl of 117 µM $CaCl_2$) was added in a rate of 100 µl/well, final concentration 11.7 µM), and the fluorescence value reflecting the amount of extramitochondrial calcium was determined (fluorescence wavelength: 488 nm, excitation wavelength: 527 nm). The measurement was carried out by a functional drug screening system, FDSS3000 (Hamamatsu Photonics K. K.). Incubation at 30° C. and shaking of the well plate were carried out by devices equipped in the system. Calcium ($CaCl_2$)) was added at intervals of one minute in accordance with the program of FDSS3000 software.

Figure 2:
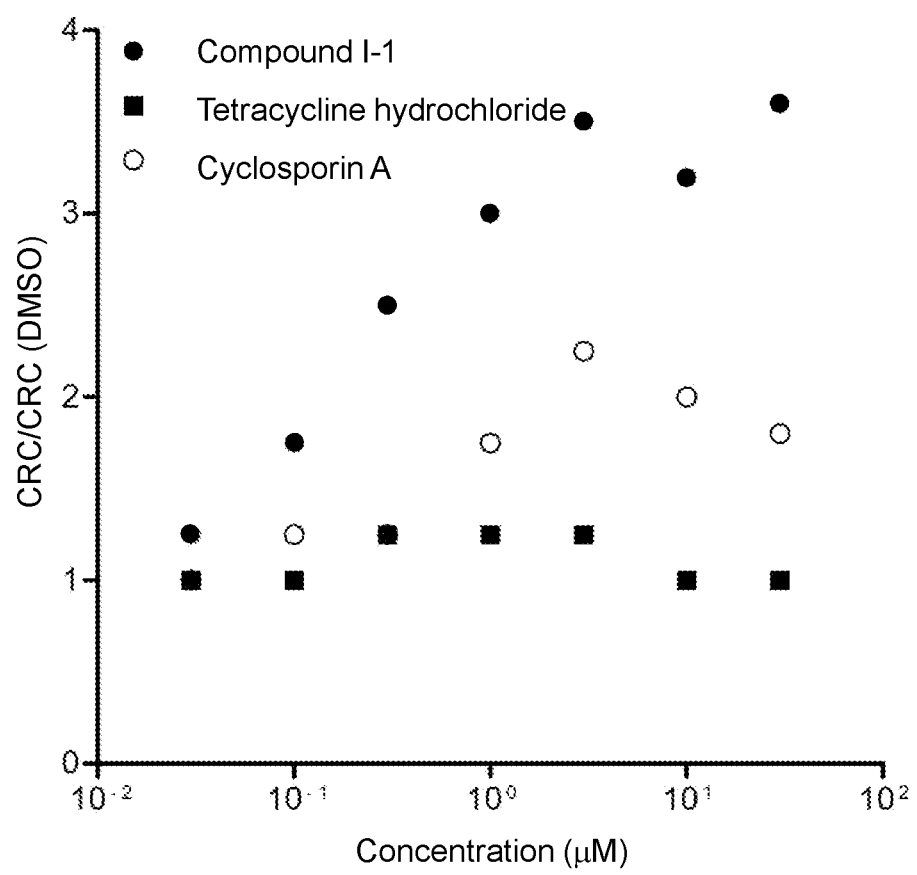
FIG. 2 shows the dose-dependent response on value of CRC/CRC (DMSO) to test compound concentration in a mPTP-opening inhibitory activity test.

It was observed that the fluorescent signal value increases with addition of calcium but decreases immediately after uptake of calcium by mitochondria. Thereafter, when addition of $CaCl_2$) is repeated, a rapid increase of the signal due to opening of mPTP was observed. The (requisite) amount of calcium accumulated in mitochondria and released by opening of mPTP is CRC of mitochondria. A test compound was dissolved with the measurement buffer in the aforementioned conditions. The same test was carried out using a measurement buffer containing DMSO in the same concentration as that of a test compound. This case was regarded as a control (not containing a compound). The amount (CRC) of calcium required for inducing mPTP-opening in the presence of a test compound, and the amount (CRC (DMSO)) of calcium required for inducing mPTP-opening in the absence of the compound (control) were obtained, and then, the ratio of CRC/CRC(DMSO) was obtained and used as an evaluation criterion for mPTP-opening inhibitory activity of the test compound. The results of the test are shown in Table 1. The time-dependent change of calcium concentration in the mPTP-opening inhibitory activity test performed in the presence and absence of test compounds is shown in FIG. 1. The dose-dependent response value of CRC/CRC (DMSO) to test compound concentration is shown in FIG. 2.

TABLE 1

| Compound | Structure | mPTP-Opening inhibitory activity at 1.0 µM compound concentration CRC/CRC (DMSO) |
|---|---|---|
| I-1 | [structure] | 2.96 |

TABLE 1-continued

| Compound | Structure | mPTP-Opening inhibitory activity at 1.0 μM compound concentration CRC/CRC (DMSO) |
|---|---|---|
| I-2 | (structure) | 2.92 |
| I-3 | (structure) | 1.22 |
| Ia-1 | (structure) | 1.66 |
| Ia-2 | (structure) | 1.50 |
| Ia-3 | (structure) | 3.00 |
| Ia-4 | (structure) | 1.59 |

It is considered that cyclosporine A known as an immunosuppressant binds to cyclophilin D present in the mitochondrial matrix to inhibit mPTP-opening (reference literatures: Crompton, M et al., Biochem. J., 1988, vol. 255, p. 357-360, Inhibition by cyclosporin A of a $Ca^{2+}$-dependent pore in heart mitochondria activated by inorganic phosphate and oxidative stress (Non Patent Literature 1); and Connern C P and Halestrap A P, Biochem. J., 1994, vol. 302, p. 321-324, Recruitment of mitochondrial cyclophilin to the mitochondrial inner membrane under conditions of oxidative stress that enhance the opening of a calcium-sensitive non-specific channel (Non Patent Literature 2)). Compound I-1 can be easily synthesized from tetracycline used as a starting compound (Reference Examples 1 and 2 and Synthesis Example 2). However, tetracycline (starting compound) itself had no mPTP inhibitory activity. It has been found that compound I-1 has an activity to inhibit mPTP-opening at a lower concentration than cyclosporine A (FIG. 2).

[II-2. Cell Death Inhibitory Activity Test]

Simultaneously when mitochondria take up calcium, the membrane potential dissipates and mPTP opens. Physiologically, hydrogen peroxide generates in the mitochondrial respiratory chain with opening of mPTP and may further produce a damage to not only mitochondria but also cells. It is demonstrated that mPTP-opening inhibitor, cyclosporine A inhibits mPTP-opening and attenuates functional damage (Connern C P and Halestrap A P, Biochem. J., 1994, vol. 302, p. 321-324, Recruitment of mitochondrial cyclophilin to the mitochondrial inner membrane under conditions of oxidative stress that enhance the opening of a calcium-sensitive non-specific channel (Non Patent Literature 2); and Friberg, H et al. J. Neurosci., 1998, vol. 18(14), p. 5151-5159, Cyclosporin A, But Not FK 506, Protects mitochondria and neurons against hypoglycemic damage and implicates the mitochondrial permeability transition in cell death (Non Patent Literature 3)). Oxidative stress ascribed to hydrogen peroxide may cause cell damage downstream of Ca uptake. In the test, the relationship between mPTP-opening inhibitory effect on cells and cell death was studied by using rat adrenal pheochromocytoma-derived PC12 cells.

The PC12 cells used in the test are derived from rat adrenal pheochromocytoma but are differentiated into sympathetic neurons by a nerve growth factor, and known to cause cell death in a glutamic acid concentration dependent manner (Pereira C F, Oliveira, R, Neuroscience Research, vol. 37(3), p. 227-236, 2000, Oxidative glutamate toxicity involves mitochondrial dysfunction and perturbation of intracellular $Ca^{2+}$ homeostasis).

A growth medium (composition: Dulbecco modified MEM culture medium (Gibco 11885-084) containing 100 units of penicillin, 100 μg/mL streptomycin (Gibco 15-140-122), 2.5% inactivated fetal bovine serum (Gibco 10437-028) and 2.5% inactivated horse serum (Gibco 16050-130)) were prepared. PC12 cells were cultured in a culture dish (diameter: 100 mm, Corning 353003) containing 10 ml of the growth medium. PC12 cells cryopreserved were thawed, cultured in the growth medium for at least one week and used in the test. PC12 cells were removed with 0.25% trypsin-1 mM EDTA and subcultured. The following experiments were all carried out at 37° C. by a $CO_2$ incubator in an atmosphere containing 5% $CO_2$.

(Cell Death Induction by Glutamic Acid)

Experiments for determining the concentration of glutamic acid required for inducing cell death, were carried out. A cell fluid containing PC12 cells was prepared so as to contain $5\times10^4$ cells/900 μl. To a 96 well microplate (Corning 354429) coated with collagen IV, a cell fluid of PC12 cells was added at a rate of 90 μl/well ($5\times10^3$ cells/well) and the cells were cultured at 37° C. in the 5%-$CO_2$ condition. Twenty four hours later, 50, 100, 150, 300 or 500 mM glutamic acid was added in an amount of 10 μl/well. As a control containing no glutamic acid, an equal amount of DMSO was added. In this manner, cell death was induced in the absence of glutamic acid (i.e., 0) or in the presence of glutamic acid (a final concentration of 5, 10, 15, 30 or 50 mM). Forty eight hours later, 20 μl of MTS for CellTiter 96® AQueous One Solution Cell Proliferation Assay (Promega G3580) was added to 100 μl of culture solution in each of the wells of the microplate.

MTS used for CellTiter 96 ® AQueous One Solution Cell Proliferation Assay (Promega G3580) is a reagent for colorimetric quantitative analysis for measuring the number of viable cells in cell proliferation and cytotoxicity tests. The reagent contains tetrazolium compound (3-(4,5-dimethylthiazol-2-yl)-5-(3-caboxymethoxyphenyl)-2-(4-sulfophenyl)-2H-tetrazolium, inner salt (MTS)) and an electron coupling reagent (phenazine ethosulfate (PES)). The reagent is a novel reagent used in place of the MTS reagent commonly used. Since PES is more stabilized in the presence of MTS unlike the MTS reagent commonly used, one solution can be directly added to a cell fluid. MTS is reduced by viable cells to produce soluble formazan in a culture medium. This mechanism is the same as in the common reagent. The assay can be more easily carried out by use of the reagent compared to the MTS reagent commonly used.

Figure 3:
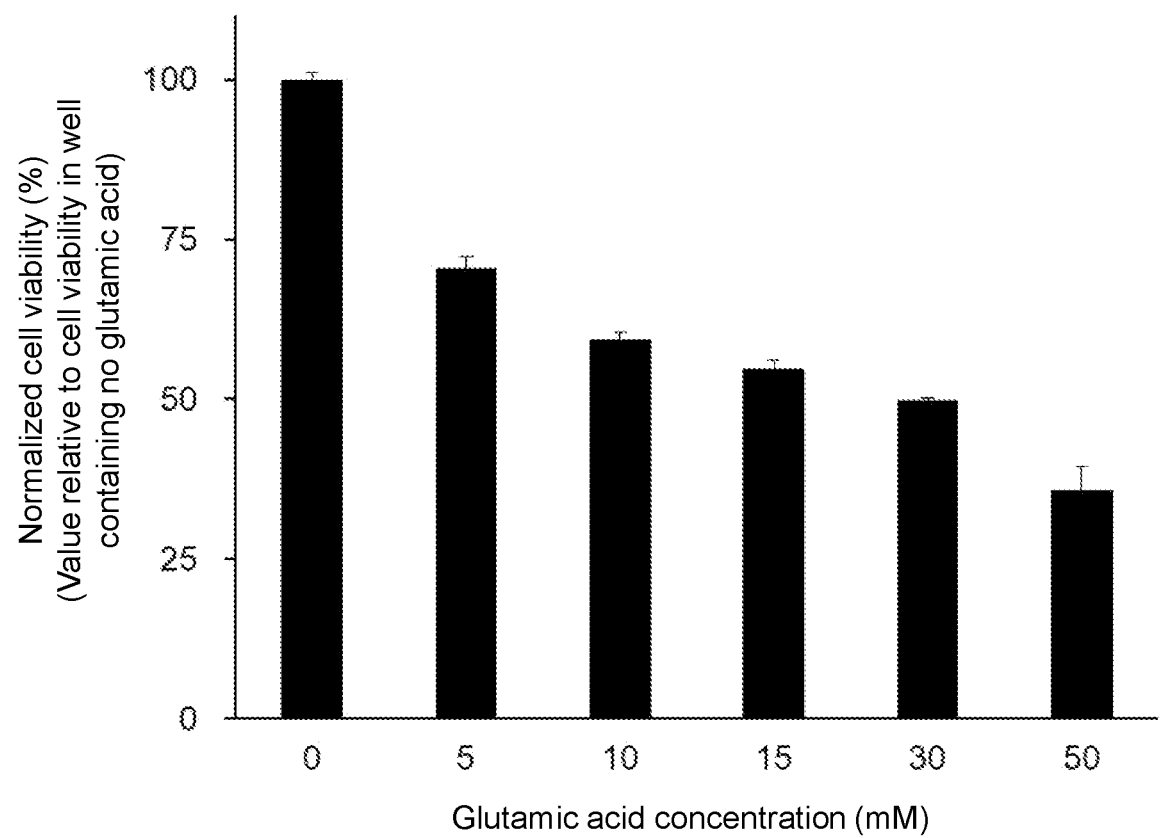
FIG. 3 shows the relationship between the concentration of glutamic acid added and cell viability in a cell death induction test by glutamic acid. The vertical axis represents cell viability (%, normalized value) relative to the cell viability in a well containing no glutamic acid (Glu(−)).

After addition of MTS for CellTiter 96 ® AQueous One Solution Cell Proliferation Assay (Promega G3580)), the microplate was placed in a $CO_2$ incubator and incubation was carried out for 4 hours. Absorbance of individual wells at a wavelength of 490 nm was measured by a spectrophotometer (SpectraMax i3 manufactured by Molecular Devices) with 700 nm used as a reference wavelength. A cell viability was calculated in accordance with the following expression (1) based on the absorbance obtained. Note that, to reduce background non-specific absorption due to excessive cell residue, culture medium and others, the obtained absorbance data were corrected based on the absorbance at a reference wavelength of 700 nm. The relationship between the concentration of glutamic acid added and cell viability is shown in FIG. 3. In the figure, the vertical axis represents cell viability relative to the cell viability in the well containing no glutamic acid (Glu(−)) (%, normalized value).

$$\text{Cell viability (\%)}=[(\text{Abs}-\text{Abm})/(\text{Abc}-\text{Abm})]\times100 \quad \text{Expression (1)}$$

Abs: Absorbance of sample (well containing cells, glutamic acid-added medium and MTS solution)

Abc: Absorbance of negative control (well containing cells, control medium and MTS solution)

Abm: Absorbance of blank (well containing control medium and MTS solution)

(Suppression of Cell Death in the Presence of Test Compound)

Based on the results of cell death induction test by glutamic acid (FIG. 3), a glutamic acid concentration of 10 mM was selected as the concentration at which cell death is effectively induced but not all cells die. Using compound I-1, and acyl esters thereof (prodrug form); i.e., compound I-4 (acetyl ester), compound I-5 (pivaloyl ester) and compound I-6 (benzoyl ester) as the test compounds, the activities of the test compounds to inhibit cell death induced by glutamic acid were evaluated.

Figure 4:
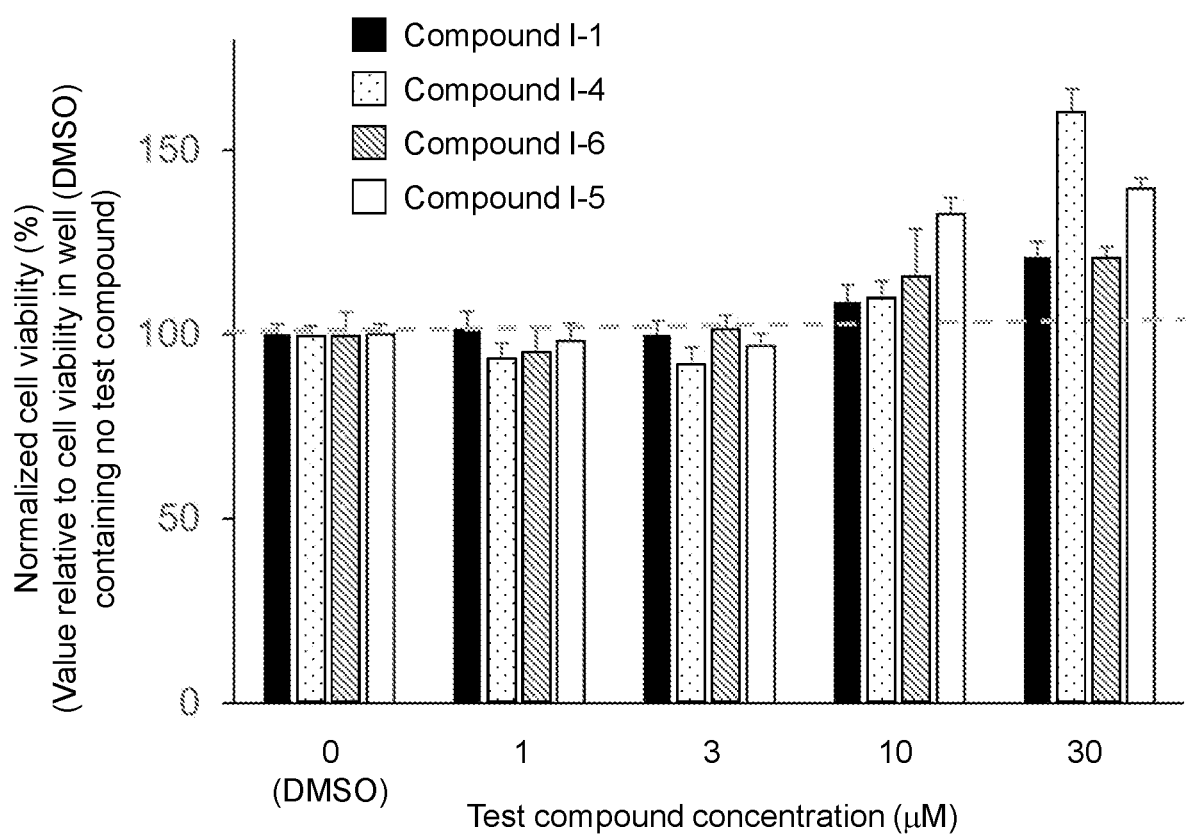
FIG. 4 shows the relationship between the concentration of a test compound added and cell viability in a cell death induction test by glutamic acid. The vertical axis represents cell viability (%, normalized value) relative to the cell viability in a well containing no test compound (DMSO).

A solution of each of the test compounds (10-fold concentration) was prepared so as to contain the test compound at a final concentration of 1, 3, 10 or 30 μM in a serum-free medium. In the same manner as in the cell death induction test by glutamic acid as mentioned above, a cell fluid of PC12 cells was added at a rate of 80 μl/well ($5\times10^3$ cells/well) in wells of a 96 well microplate (Corning 354429) coated with collagen IV and the cells were incubated at 37° C. in the 5%-$CO_2$ condition. Twenty four hours later, solutions of the test compounds (10-fold concentration) were added in an amount of 10 μl/well. An equal amount of DMSO was added as a control containing no test compound. Twenty four hours after addition of the test compounds, 50, 100, 150, 300 or 500 mM glutamic acid was added in an amount of 10 μl/well. In this manner, cell death was induced in the presence of glutamic acid at a final concentration 5, 10, 15, 30 or 50 mM. Forty eight hours later, 20 μl of MTS for CellTiter 96 ® AQueous One Solution Cell Proliferation Assay (Promega G3580) was added to 100 μl of culture solution in each of the wells of the microplate. The microplate was placed in a $CO_2$ incubator and incubation was carried out for 4 hours. Absorbance of individual wells at a wavelength of 490 nm was measured by a spectrophotometer (SpectraMax i3 manufactured by Molecular Devices) with 700 nm used as a reference wavelength. A cell viability was calculated in accordance with the following expression (2) based on the absorbance obtained. Note that, to reduce background non-specific absorption due to excessive cell residue, culture medium and others, the obtained absorbance data were corrected based on the absorbance at a reference wavelength of 700 nm. The relationship between the concentration of the test compound added and cell viability is shown in FIG. 4. In the figure, the vertical axis represents relative cell viability to the cell viability in a well containing no test compound (DMSO) (%, normalized value).

Cell viability (%)=[(Abs−Abm)/(Abc−Abm)]×100   Expression (2)

Abs: Absorbance of sample (well containing cells, glutamic acid-added medium and MTS solution)

Abc: Absorbance of negative control (well containing cells, control medium and MTS solution)

Abm: Absorbance of blank (well containing control medium and MTS solution)

As shown in FIG. 4, compound I-1 protected PC12 cells, to no small extent, from cell death induced by glutamic acid. Acyl esters (prodrug forms) of compound I-1, i.e., compounds I-4, I-5 and I-6, exhibited stronger protective actions.

[II-3. Suppression Test for Cell Death Caused by Cerebral Ischemia]

Conventional mPTP-opening inhibitors including cyclosporine A are reported to have an action to protect nerve cells from cell death, more specifically an action to reduce necrotic area in a cerebral infarction model (Uchino, H et al., Brain Res, 1998, vol. 812, p. 216-226, amelioration by cyclosporin A of brain damage in transient forebrain ischemia in the rat (Non Patent Literature 4); Korde A S et al., J Neurotrauma., vol. 24(5), p. 895-908, 2007, Protective actions of NIM811 in transient focal cerebral ischemia suggest involvement of the mitochondrial permeability transition (Non Patent Literature 5); Muramatsu Y et al., Brain Res., 2007, vol. 1149, p. 181-90, Neuroprotective efficacy of FR901459, a novel derivative of cyclosporin A, in in vitro mitochondrial damage and in vivo transient cerebral ischemia models (Non Patent Literature 6)). In the test, to evaluate the action of test compounds to protect cells from cell death in vivo, a local cerebral ischemia mouse model was prepared by permanent middle cerebral artery occlusion (pMCA-O) and actions of test compounds to protect the cells at a brain injury site one day after occlusion were examined. Note that, for preparing a permanent middle cerebral artery occlusion model, C57BL/6JJmsSlc was used.

(Preparation of Compound I-1 or Solvents for Control)

Compound I-1, which is to be dissolved in a requisite amount when used, was stored in a refrigerator until use. As the solvent, dimethyl sulfoxide (DMSO: FUJIFILM Wako Pure Chemical Corporation), polyethylene glycol (PEG400: FUJIFILM Wako Pure Chemical Corporation) and phosphate buffered saline (PBS: FUJIFILM Wako Pure Chemical Corporation) were used. The final concentrations of DMSO, PEG400 and PBS were set to be 15%, 50% and 35%, respectively.

(Administration of Compound I-1 or Solvents for Control)

Compound I-1 or each of the solvents for control was intraperitoneally administered one day and 4 hours before cerebral ischemia, and 2 hours after cerebral ischemia, in a volume of 5 ml/kg, by use of 1 ml-tuberculin syringe attached to needle 26 G (Terumo Corporation). The final dosage amount of compound I-1 was 100 mg/kg.

(Preparation of Local Cerebral Ischemia Model)

Twenty one male mice of 11 weeks old were raised for one week for acclimatization were subjected to a surgical operation. Each of the mice was anesthetized with 3% isoflurane, placed in lateral decubitus position on an operating table and immobilized on the table, and thereafter, the temporal region of the head was sterilized with alcohol. The skin and temporalis muscle between the left outer earhole and the eyeball were dissected up to the zygomatic arch under 1.5% isoflurane anesthesia and removed from the skull. A small window of about 2 to 3 mm was opened by an electric drill in the bone between a foramen ovale at the base of the skull and the orbital fissure. The dura matter on the bone window was carefully dissected to expose the left middle cerebral artery. Vascular occlusion was carried out by cauterizing the position (distal portion) immediately below the site at which the middle cerebral artery and olfactory tract (olfactory tract) are crossed, by bipolar coagulation forceps (MICRO-30 MIZUHO IKA KOGYO) and cutting by micro surgical scissors (Koistinaho, M et al., Journal of Cerebral Blood Flow & Metabolism, 2005, vol. 25, p. 460-467, Minocycline protects against permanent cerebral ischemia in wild type but not in matrix metalloprotease-9-deficient mice; Tamura, a et al., Journal of Cerebral Blood Flow & Metabolism, 1981, vol. 1, p. 53-60, Focal cerebral ischemia in the rat: Description of technique and early neuropathological consequences following middle cerebral artery occlusion). After the surgical wound site was sutured, enrofloxacin (5 mg/kg s.c.) and buprenorphine (0.1 mg/kg s.c.) were administered and anesthesia was terminated to complete the cerebral ischemia treatment. Animals (mice) were back to a home cage and allowed to freely take food and water. A series of operations were all carried out under a surgical microscope. In order to minimize bleeding during the surgery and maintain body temperature, mice were kept warm by a heating pad.

(Preparation of Brain Specimen and Quantification of Brain Injury Site)

One day after cerebral ischemia, the head of each of the mice was removed under anesthesia with 2% isoflurane and the whole brain was carefully excised out. The portion between 3 mm anterior and 3 mm posterior to the coronal suture (Bregma) was taken out and sliced by a mouse brain slicer (Brain matrix, Brain Science Idea Co., Ltd.) to obtain continuous 6 coronally 1-mm width brain sections/mouse. These brain sections were stained in physiological saline containing 10 mL of 2% 2,3,5-triphenyl tetrazolium chloride (TTC) (manufactured by Hayashi Pure Chemical Ind., Ltd.) for 30 minutes (Bederson, J B et al., Stroke, 1986, vol. 17, p. 1304-1308, Evaluation of 2,3,5-triphenyltetrazolium chloride as a stain for detection and quantification of experiment a cerebral Infarction in rats). The six coronally sections were photographed by a digital camera (SX400IS Canon Power shot, the number of recording pixels: 4608×3456) and used as brain samples.

Figure 5:
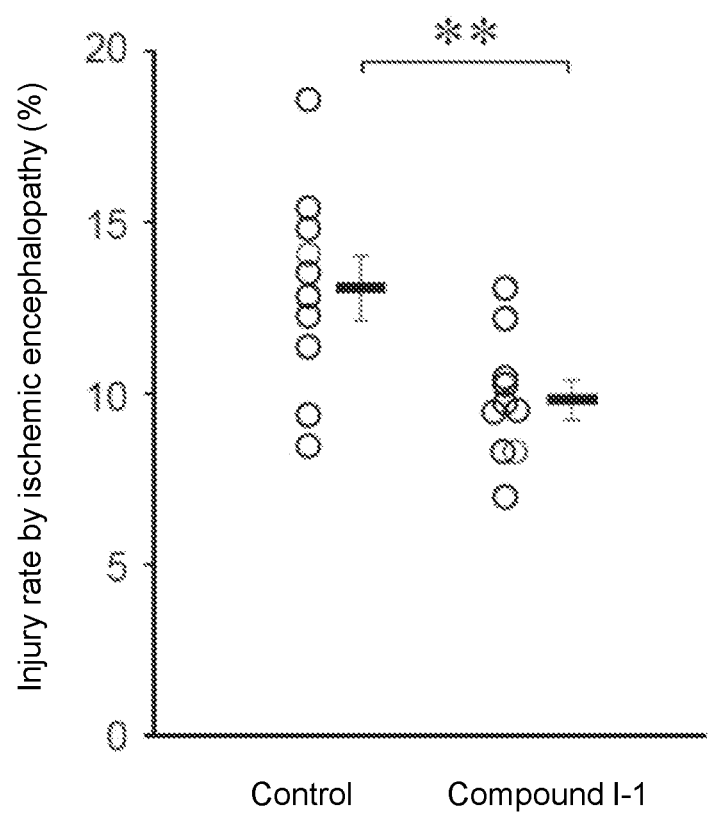
FIG. 5 shows the cerebral cortex injury rates by ischemic encephalopathy in a compound I-1 administration group and a control (solvent administration) group in a suppression test for cell death caused by cerebral ischemia. Open circles represent values of individual mice in the compound administration group and the control group. The solid line and error bar respectively represent an average value and an error range, with respect to all mice contained in the administration group and the control group. Reference symbol ** indicates that P value relative to the control group calculated by student t-test was less than 0.01.

The size of a brain injury site was determined as follows. The images of brain samples of each individually photographed were enlarged. A cerebral cortex injury site, a basal ganglia injury site and the total area of the brain in each cross-section were marked and individual areas of them were determined by image analysis software (WinROOF 2015, MITANI CORPORATION). Finally, injury rate (%) by ischemic encephalopathy was calculated in accordance with the following expression (3). The cerebral cortex injury rates by ischemic encephalopathy in a compound I-1 administration group and a control (solvent administration) group are shown in FIG. 5. In the figure, open circles represent values of individual mice in the compound administration group and the control group. The solid line and error bar respectively represent an average value and an error range, with respect to all mice contained in the administration group and the control group. Reference symbol ** indicates that P value relative to the control group calculated by student t-test was less than 0.01.

Injury rate (%)=Injury area (mm$^2$) of sections 1 to 6/total brain area (mm$^2$) of sections 1 to 6×100  Expression (3)

Deaths of animals were not seen during the test period. Brain injury regions one day after cerebral ischemia in the model were observed in the cerebral cortex and basal ganglia, blood flow (supply) of which is controlled by the middle cerebral artery, but the regions are mostly localized in the cerebral cortex. In this model, the average brain injury rate in the test compound administration group was lower by about 25% than the control group. This is a statistically significant change (total brain injury rate; P<0.05, cerebral cortex injury rate; P<0.01) (FIG. 5). From the test results, it was found that compound I-1 has a protective action against a brain injury site of a local cerebral ischemia model, one day after permanent middle cerebral artery occlusion (pMCA-O) of mice.

The present invention is not limited to Examples, and various modified examples are included in the invention. Examples are described in detail in order to facilitate understanding of the present invention, and the present invention is not limited to that having all constitutions described herein. Other constitutions may be added to the constitutions of individual Examples, and the constitutions of Examples may be partly deleted and/or replaced with other constitutions.

All publications, patents and patent applications cited in the present specification are incorporated herein in their entireties by reference.

The invention claimed is:

1. A method for preventing or treating a disease, symptom or disorder caused by opening of mitochondrial permeability transition pore (mPTP), comprising administering an effective amount of a compound represented by formula (I):

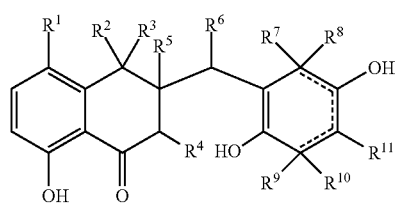

(I)

wherein
$R^1$ represents a hydrogen, a halogen, or a substituted or unsubstituted amino,
$R^2$, $R^3$, $R^4$ and $R^5$ satisfy either one of the following conditions (i) and (ii):
(i)
$R^2$ represents a hydrogen or a substituted or unsubstituted $C_1$ to $C_5$ alkyl,
$R^3$ and $R^4$ together form a —O—C(=O)—, wherein a carbon atom to which $R^3$ is attached is bound to an O, and a carbon atom to which $R^4$ is attached is bound to a C(=O), and
$R^5$ represents a hydrogen,
(ii)
$R^2$ represents a hydrogen or a substituted or unsubstituted $C_1$ to $C_5$ alkyl, and
$R^3$, $R^4$ and $R^5$ each represent a hydrogen,
$R^6$ represents a hydrogen or a hydroxyl, and
$R^7$, $R^8$, $R^9$ and $R^{10}$ satisfy either one of the following conditions (xi) and (xii)
(xi)
$R^7$ and $R^8$ together form an oxo (=O), and
$R^9$ and $R^{10}$ together form an oxo (=O),
(xii)
$R^7$ and $R^9$ each represent a hydroxyl,
$R^8$, together with a carbon atom attached thereto and an adjacent carbon atom, forms an ethene-1,2-diyl, and
$R^{10}$, together with a carbon atom attached thereto and an adjacent carbon atom, forms an ethene-1,2-diyl,
a bond represented by a solid line and a dotted line is a single bond or a double bond,
$R^{11}$ represents a —C(=O)—NH$_2$ or a —CN,
a stereoisomer thereof, or a pharmaceutically acceptable salt thereof, or a pharmaceutically acceptable solvate thereof, as an active ingredient, to a subject in need of the prevention or treatment of the disease, symptom or disorder,
wherein the disease, symptom or disorder caused by opening of mitochondrial permeability transition pore (mPTP) is at least one selected from the group consisting of ischemia-reperfusion injury in percutaneous coronary angioplasty, and a neurodegenerative disease.

2. The method according to claim 1, wherein
$R^2$ represents a hydrogen or a substituted or unsubstituted $C_1$ to $C_5$ alkyl,
$R^3$ and $R^4$ together form a —O—C(=O)—, wherein a carbon atom to which $R^3$ is attached is bound to an O, and a carbon atom to which $R^4$ is attached is bound to a C(=O), and
$R^5$ represents a hydrogen.

3. The method according to claim 1, wherein $R^1$ represents a hydrogen.

4. The method according to claim 1, wherein $R^{11}$ represents a —C(=O)—NH$_2$.

5. The method according to claim 1, wherein the compound represented by formula (I), a stereoisomer thereof, a pharmaceutically acceptable salt thereof, or a pharmaceutically acceptable solvate thereof is

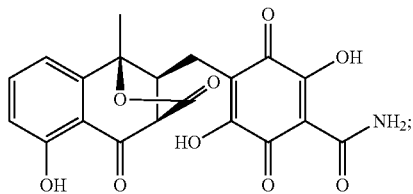

(compound I-1)

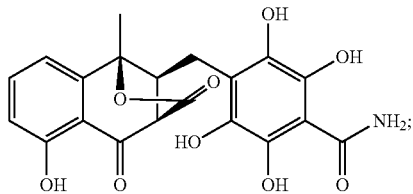

(compound I-2)

-continued (compound I-3)
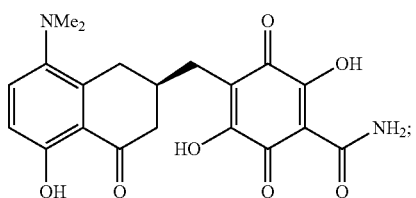

(compound I-4)
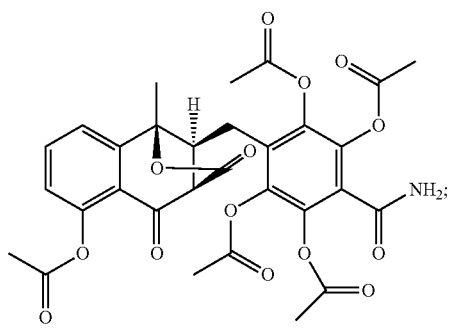

(compound I-5)
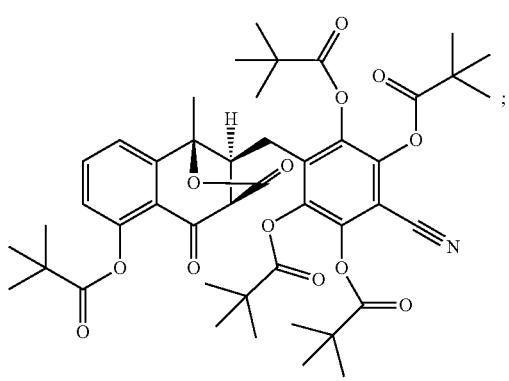

(compound I-6)
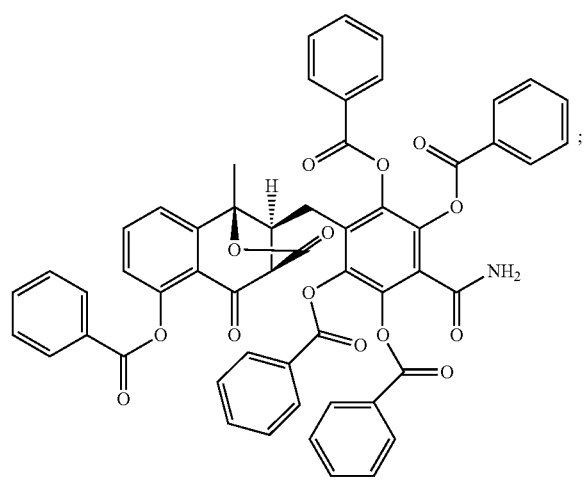

-continued (compound Ia-1)
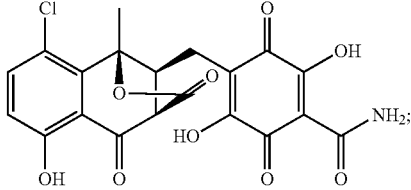

(compound Ia-2)
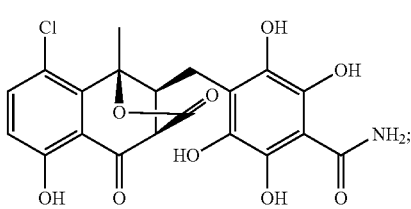

(compound Ia-3)
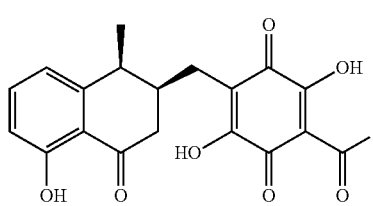

or (compound Ia-4)
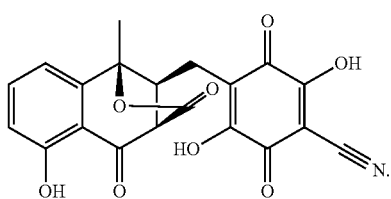

6. The method according to claim 1, wherein the neurodegenerative disease is amyotrophic lateral sclerosis, Alzheimer's disease, Huntington's disease, Parkinson's disease, or multiple sclerosis.

7. A compound represented by formula (Ia):

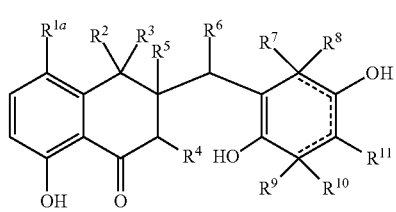

(Ia)

wherein $R^{1a}$ represents a hydrogen or a halogen, $R^2$, $R^3$, $R^4$ and $R^5$ satisfy the following condition (ii):

(ii)

$R^2$ represents a hydrogen or a substituted or unsubstituted $C_1$ to $C_5$ alkyl, $R^3$, $R^4$ and $R^5$ each represent a hydrogen, $R^6$ represents a hydrogen or a hydroxyl, and $R^7$, $R^8$, $R^9$ and $R^{10}$ satisfy either one of the following conditions (xi) and (xii):

(xi)

$R^7$ and $R^8$ together form an oxo (=O), and $R^9$ and $R^{10}$ together form an oxo (=O), (xii)

$R^7$ and $R^9$ each represent a hydroxyl, $R^8$, together with a carbon atom attached thereto and an adjacent carbon atom, forms an ethene-1,2-diyl, and $R^{10}$, together with a carbon atom attached thereto and an adjacent carbon atom, forms an ethene-1,2-diyl, a bond represented by a solid line and a dotted line is a single bond or a double bond, $R^{11}$ represents a —C(=O)—NH$_2$ or a —CN, with the proviso that if $R^2$, $R^3$, $R^4$ and $R^5$ satisfy conditions (ii), $R^6$ represents a hydrogen and $R^{11}$ represents a —C(=O)—NH$_2$, $R^{1a}$ represents a hydrogen, a stereoisomer thereof, a salt thereof, or a solvate thereof.

8. The compound, the stereoisomer thereof, the salt thereof, or the solvate thereof according to claim 7, wherein the compound represented by formula (1a), the stereoisomer thereof, the salt thereof, or the solvate thereof is

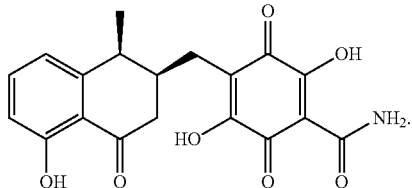

(compound Ia-3)

* * * * *